United States Patent
Geisweid et al.

(10) Patent No.: US 12,049,829 B2
(45) Date of Patent: Jul. 30, 2024

(54) HEAT SHIELD FOR A SUPERCHARGING DEVICE

(71) Applicant: BorgWarner Inc., Auburn Hills, MI (US)

(72) Inventors: Daniel Geisweid, Winnweiler (DE); Patrick Weber, Niederkirchen (DE); Thomas Koerner, Dorn-Duerkheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/077,492

(22) Filed: Dec. 8, 2022

(65) Prior Publication Data

US 2024/0125250 A1    Apr. 18, 2024

(30) Foreign Application Priority Data

Oct. 17, 2022   (DE) .................. 10 2022 210 936.8

(51) Int. Cl.
   *F01D 25/14*   (2006.01)
   *F02B 33/40*   (2006.01)
   *F02B 39/00*   (2006.01)

(52) U.S. Cl.
   CPC ........... *F01D 25/145* (2013.01); *F02B 33/40* (2013.01); *F02B 39/00* (2013.01); *F05D 2230/60* (2013.01); *F05D 2240/15* (2013.01); *F05D 2250/231* (2013.01)

(58) Field of Classification Search
   CPC ........ F01D 25/145; F02B 33/40; F02B 39/00; F05D 2230/60; F05D 2240/15; F05D 2250/231

USPC ............................................... 60/605.1
   See application file for complete search history.

(56) References Cited

U.S. PATENT DOCUMENTS

| | | | | |
|---|---|---|---|---|
| 5,403,150 | A | * | 4/1995 | McEachern, Jr. ... F04D 29/5853 415/177 |
| 2006/0010880 | A1 | * | 1/2006 | Kim ................... F01D 11/003 60/805 |
| 2013/0039747 | A1 | * | 2/2013 | Heidingsfelder ....... F01D 25/26 415/177 |

(Continued)

FOREIGN PATENT DOCUMENTS

| | | | |
|---|---|---|---|
| CN | 203189118 U | * | 9/2013 |
| CN | 203769865 U | * | 8/2014 |

(Continued)

OTHER PUBLICATIONS

JP-2009529620-A, Translation (Year: 2023).*

(Continued)

*Primary Examiner* — J. Todd Newton
(74) *Attorney, Agent, or Firm* — Eric L. Doyle; Stephan A. Pendorf; Patent Central LLC

(57) ABSTRACT

The present invention relates to a heat shield (100) for a supercharging device (1), comprising a first ring portion (110), which is situated at the outside in a radial direction (24) and which is designed to bear the heat shield (100), and a second ring portion (120), which is situated at the inside in a radial direction (24) and which extends from the first ring portion (110). The second ring portion (120) has at least one structure-stiffening feature (200), the at least one structure-stiffening feature (200) being of bead-like form.

17 Claims, 8 Drawing Sheets

(56) References Cited

U.S. PATENT DOCUMENTS

| | | | |
|---|---|---|---|
| 2019/0112945 A1* | 4/2019 | Kurle | F01D 9/026 |
| 2020/0131926 A1* | 4/2020 | Bolbolan | F02C 6/12 |
| 2022/0316355 A1 | 10/2022 | Hahn et al. | |

FOREIGN PATENT DOCUMENTS

| | | | | |
|---|---|---|---|---|
| CN | 104196581 A | * | 12/2014 | |
| CN | 210768950 U | * | 6/2020 | |
| CN | 211500729 U | * | 9/2020 | |
| CN | 211819530 U | * | 10/2020 | |
| CN | 211820086 U | * | 10/2020 | |
| CN | 212898636 U | * | 4/2021 | |
| CN | 214366230 U | * | 10/2021 | |
| CN | 218882304 U | * | 4/2023 | |
| DE | 202009011843 U1 | * | 2/2010 | B60R 13/0876 |
| DE | 102011114060 A1 | * | 3/2013 | F01D 25/145 |
| DE | 102014223306 A1 | | 5/2016 | |
| DE | 102018210024 A1 | | 12/2019 | |
| DE | 102021211009 A1 | | 3/2023 | |
| EP | 3392466 A1 | * | 10/2018 | F01D 17/165 |
| JP | 2009529620 A | * | 9/2009 | |
| KR | 20160043914 A | * | 4/2016 | |
| WO | WO-2009068460 A1 | * | 6/2009 | F02C 6/12 |
| WO | 2015051891 A1 | | 4/2015 | |
| WO | WO-2015119828 A1 | * | 8/2015 | F01D 17/14 |

OTHER PUBLICATIONS

CN-203769865-U, translation (Year: 2023).*
Translation KR-20160043914-A (Year: 2023).*
Translation CN-104196581-A (Year: 2023).*
Translation CN-211820086-U (Year: 2023).*
Translation CN-211500729-U (Year: 2023).*
Translation CN-218882304-U (Year: 2023).*
Translation CN-203189118-U (Year: 2023).*
Translation CN-214366230-U (Year: 2023).*
Translation CN-211819530-U (Year: 2023).*
Translation CN-212898636-U (Year: 2023).*
Translation CN-210768950-U (Year: 2023).*
Translation WO-2015119828-A1 (Year: 2023).*
Translation EP-3392466-A1 (Year: 2023).*
Translation DE-102011114060-A1 (Year: 2023).*
Translation WO-2009068460-A1 (Year: 2023).*
Translation of DE-202009011843-U1 (Year: 2023).*

* cited by examiner

HEAT SHIELD FOR A SUPERCHARGING DEVICE

TECHNICAL FIELD

The present invention relates to a heat shield for a supercharging device, to a turbine arrangement with a heat shield of said type, to a supercharging device with a turbine arrangement of said type, and to a method for producing a heat shield for a supercharging device.

BACKGROUND

Ever-increasing numbers of newer-generation vehicles are being equipped with supercharging devices in order to satisfy requirement-related aims and comply with legal regulations. In the development of supercharging devices, it is sought to optimize both the individual components and the system as a whole in terms of reliability and efficiency.

Known supercharging devices normally have at least one compressor with a compressor wheel, which is connected to a drive unit via a common shaft. The compressor compresses the fresh air that is drawn in for the internal combustion engine or for the fuel cell. This increases the air or oxygen quantity that is available to the engine for combustion or to the fuel cell for reaction. This in turn leads to an increase in power of the internal combustion engine or of the fuel cell. Supercharging devices may be equipped with different drive units. The prior art has disclosed in particular electric superchargers, in the case of which the compressor is driven by means of an electric motor, and turbochargers, in the case of which the compressor is driven means of a turbine. Combinations of both systems are also described in the prior art.

Modern supercharging devices are equipped with a power adjusting device, by means of which the generation of power by the supercharging device can be adjusted or varied. Known power adjusting devices are for example a variable turbine geometry (VTG) or a wastegate flap (WG). A VTG is an adjustable guide apparatus for varying an incoming flow to a turbine wheel of the turbine. By varying the incoming flow, it is possible in particular to vary the flow speed of the exhaust-gas stream that is fed to the turbine wheel, which leads to a corresponding change in power of the supercharging device.

Owing to high temperatures and a high pressure level of the fluid (hot exhaust gas) in the turbine, in particular upstream of the turbine wheel, it is the case in known configurations that a heat shield is arranged between the turbine and the bearing housing in order to protect the bearing housing and a bearing arrangement of the shaft against heat transfer from hot exhaust gas. Such a heat shield may also be used in configurations in which a VTG is provided in the turbine. In the known configurations, fluid which passes behind the heat shield (that is to say between the bearing housing and heat shield) and which leads to a high pressure level and high temperatures can lead to vibration and/or deformation or failure of the heat shield. This in turn can result in the heat shield making contact with a turbine wheel arranged in the turbine or with other components in the turbine. This can result in damage both to the heat shield and to the turbine wheel or to other components. Such damage may also arise in configurations in which the heat shield is braced between a VTG and a spring element, which is supported on the bearing housing. In this case, the spring element can lose axial contact with the bearing housing (owing to a high pressure level and high temperatures between the spring element and the bearing housing), as a result of which a pressure level between the spring element and the heat shield can increase and a pressure impulse can act on the heat shield, which in turn can lead to a movement in the direction of the turbine wheel or to vibration and/or deformation or failure of the heat shield.

It is an object of the present invention to provide a heat shield for a supercharging device, which heat shield exhibits increased stability and robustness.

SUMMARY OF THE INVENTION

The present invention relates to a heat shield as claimed in claim 1. The invention furthermore relates to a turbine arrangement as claimed in claim 12 with a heat shield of said type. The invention furthermore relates to a supercharging device as claimed in claim 14 with a turbine arrangement of said type, and to a method for producing a heat shield for a supercharging device as claimed in claim 15.

According to a first aspect of the present invention, a heat shield for a supercharging device comprises a first ring portion, which is situated at the outside in a radial direction and which is designed to bear the heat shield, and a second ring portion, which is situated at the inside in a radial direction and which extends from the first ring portion. The second ring portion has at least one structure-stiffening feature, the at least one structure-stiffening feature being of bead-like form. By virtue of the second ring portion of the heat shield having at least one structure-stiffening feature that is of bead-like form, it is possible to achieve greater stiffness and/or stability or robustness of the heat shield, and thus a structure which is more robust with respect to high pressures and/or temperatures. In this way, the risk of failure of individual components, for example of the heat shield and/or of the turbine wheel or of further components in a turbine, can be reduced or prevented. Here, a "structure-stiffening feature" can be understood to mean a structure that leads to stiffening, and thus an improvement in stability/robustness, of the heat shield, in particular with regard to deformation and/or vibration in an axial direction. Furthermore, the heat shield can protect the bearing housing and a bearing arrangement of the shaft against heat transfer from hot fluid (in particular exhaust gas).

In refinements, the at least one structure-stiffening feature may extend at least in certain portions in a circumferential direction. Here, the at least one structure-stiffening feature may also extend in encircling fashion in a circumferential direction. In particular, the at least one structure-stiffening feature may run concentrically with respect to the heat shield.

The at least one structure-stiffening feature may have an elevation that is connected via an axial wall portion to the second ring portion. In refinements, the at least one structure-stiffening feature may be arranged on the second ring portion such that, when the heat shield is arranged in an axial direction between a turbine wheel, which is arranged in a turbine housing, and a bearing housing, which is coupled to the turbine housing, the elevation may extend axially toward the turbine wheel or the elevation may extend axially toward the bearing housing.

In refinements, the at least one structure-stiffening feature is of arcuate form at least in certain portions in cross section. In particular, the elevation and/or the axial wall portion may be of arcuate form at least in certain portions.

In refinements, the at least one structure-stiffening feature may be of arcuate form throughout in cross section, wherein, in particular, the elevation and the axial wall portion may be of arcuate form throughout. Alternatively, the at least one structure-stiffening feature may be of planar form at least in certain portions in cross section, wherein, in particular, the elevation and the axial wall portion may be of planar form at least in certain portions in cross section.

In refinements, the elevation may be of planar form at least in certain portions in cross section, wherein the planar portion of the elevation may be arranged in a plane that runs parallel or at an angle with respect to the second ring portion.

In refinements, the axial wall portion may be of planar form at least in certain portions in cross section, and the planar portion of the axial wall portion may be configured to be orthogonal or conical with respect to the second ring portion.

On a side of the elevation that faces toward the second ring portion, in particular between the elevation and axial wall portion, the at least one structure-stiffening feature may have an inner radius. Here, the inner radius may be between 0.2 mm and 1.6 mm, preferably between 0.3 mm and 1.2 mm. A high stiffness of the heat shield can be provided by means of these radii.

A transition radius on a side of the elevation that faces toward the second ring portion, between the second ring portion and the at least one structure-stiffening feature, in particular between the second ring portion and the axial wall portion, may be equal to or greater than the inner radius.

In refinements, the second ring portion may have multiple openings that are spaced apart from one another in the circumferential direction. Pressure equalization or pressure relief on the rear side of the heat shield (that is to say on a side that faces toward the bearing housing) can be achieved by means of the multiple openings. In refinements, the multiple openings may be arranged in the elevation and/or in the axial wall portion and/or in the second ring portion.

The heat shield may have an inside edge with an inner diameter and an outside edge with an outer diameter. In refinements, at the inside edge, the heat shield may have multiple cutouts which extend in a radial direction from the inside edge. In particular, the multiple cutouts may be spaced apart uniformly in the circumferential direction. Pressure equalization or pressure relief on the rear side of the heat shield (that is to say on a side that faces toward the bearing housing) can be achieved by means of the multiple openings.

In refinements, the second ring portion may extend at an angle with respect to the first ring portion. In particular, the second ring portion may be conical with respect to the first ring portion.

The heat shield may have a first side surface and a second side surface that is arranged opposite the first side surface.

The heat shield may have a first plane, which runs through the first ring portion at the first side surface and which is arranged orthogonally with respect to the axial direction. Furthermore, the heat shield may have a second plane, which is arranged so as to be spaced apart in an axial direction from, and parallel to, the first plane. The second ring portion may extend axially as far as the second plane.

In refinements, the first ring portion may be of planar form at least in certain portions. The planar portion may extend in the radial direction in the first plane. The first ring portion and the second ring portion may be connected by a third ring portion, wherein, in particular, the third ring portion may be of conical form with respect to the first ring portion, and/or may be of arcuate form. In refinements, the second ring portion may extend as far as an intermediate diameter as measured in a radial direction, wherein a ratio of the intermediate diameter to the outer diameter may be at least 0.7.

In refinements, the elevation may extend as far as a maximum elevation height, the maximum elevation height being measured between a third plane, which runs on a side surface, facing toward the elevation, of the second ring portion, and a tangent to the maximum height of the elevation, which tangent runs parallel to said third plane.

In refinements, the heat shield may have a material thickness. The at least one structure-stiffening feature may be formed on the second ring portion such that the material thickness thereof changes by at most 20% in relation to the material thickness in adjacent regions of the second ring portion.

In refinements, a ratio of the maximum elevation height to the material thickness may be between 0.40 and 2.80, in particular between 0.60 and 2.50.

In refinements, the maximum elevation height may be greater than the material thickness of the second ring portion. In particular, the maximum elevation height may be at least two times greater than the material thickness.

In refinements, the at least one structure-stiffening feature may extend in the radial direction over more than 50% of a radial extent of the second ring portion. In one refinement, the at least one structure-stiffening feature may be of elongate form and extend in a radial direction.

In refinements, the second ring portion may have at least two structure-stiffening features, wherein, in particular, the at least two structure-stiffening features may each be of bead-like form. By means of these refinements, it is possible to achieve even greater stiffness and/or stability of the heat shield, and thus realize a structure which is more robust with respect to high pressures and/or temperatures. Here, the number of structure-stiffening features on the second ring portion may be adapted in accordance with a structural size of the heat shield.

In one refinement, the at least two structure-stiffening features may be spaced apart uniformly from one another in a circumferential direction.

In other refinements, the at least two structure-stiffening features may be spaced apart from one another in a radial direction. Here, the second ring portion may have a first structure-stiffening feature, which is situated radially at the inside and which has a first elevation, and at least one second structure-stiffening feature, which is situated radially at the outside and which has a second elevation.

In refinements, the first elevation and the second elevation may be arranged on the same side surface of the heat shield. In particular, the first elevation and the second elevation may be arranged on the first side surface of the heat shield. Alternatively, the first elevation and the second elevation may be arranged on the second side surface of the heat shield.

Alternatively, the first elevation and the second elevation may be arranged on different side surfaces of the heat shield. In particular, the first elevation may be arranged on the first side surface and the second elevation may be arranged on the second side surface.

In refinements, the first elevation and the second elevation may be arranged on the second ring portion such that, when the heat shield is arranged in an axial direction between a turbine wheel, which is arranged in a turbine housing, and a bearing housing, which is coupled to the turbine housing, the first elevation and the second elevation extend axially toward the turbine wheel, or the first elevation and the second elevation extend axially toward the bearing housing, or the first elevation extends axially toward the turbine wheel and the second elevation extends axially toward the bearing housing.

In refinements, a first radial extent of the first elevation may be equal to or greater than a second radial extent of the second elevation as measured in the radial direction.

In refinements, the multiple openings may be arranged in the first elevation and/or in a first axial wall portion that connects the first elevation to the second ring portion.

In refinements, the first elevation may extend as far as a first maximum elevation height, and the second elevation may extend as far as a second maximum elevation height. The first maximum elevation height may be equal to or greater than the second maximum elevation height. The respective maximum elevation height may be measured between a third plane, which runs on a side surface, facing toward the respective elevation, of the second ring portion, and a tangent to the maximum height of the respective elevation, which tangent runs parallel to said third plane.

In refinements, the first maximum elevation height may be between 0.4 mm and 1.2 mm, in particular between 0.5 mm and 1.1 mm. The second maximum elevation height may be between 0.2 mm and 0.6 mm, in particular between 0.25 mm and 0.55 mm.

In refinements, a ratio of the first maximum elevation height to the material thickness may be between 0.80 and 2.80, in particular between 1.00 and 2.50. In refinements, a ratio of the second maximum elevation height to the material thickness may be between 0.40 and 2.00, in particular between 0.60 and 1.80.

In refinements, the heat shield may comprise a sheet-metal material.

According to a second aspect of the present invention, a turbine arrangement comprises a turbine with a turbine housing and with a turbine wheel arranged in said turbine housing. The turbine arrangement furthermore comprises a shaft, which is coupled to the turbine wheel, and a bearing housing for rotatably bearing the shaft, the bearing housing being coupled to the turbine housing. The turbine arrangement furthermore comprises a heat shield according to the first aspect of the present invention, the heat shield being arranged in an axial direction between the turbine wheel and the bearing housing. Here, the heat shield may have all of the refinements described above. By virtue of the second ring portion of the heat shield having at least one structure-stiffening feature that is of bead-like form, it is possible to achieve greater stiffness and/or stability or robustness of the heat shield, and thus a structure which is more robust with respect to high pressures and/or temperatures. Furthermore, the risk of failure of individual components, for example of the heat shield and/or of the turbine wheel or of further components in a turbine, can be reduced or prevented. Furthermore, the heat shield can protect the bearing housing and a bearing arrangement of the shaft against heat transfer from hot fluid (in particular exhaust gas).

In refinements, the heat shield may have a first side surface and an oppositely situated second side surface, wherein the first side surface may face toward the turbine wheel and wherein the second side surface may face toward the bearing housing.

In refinements, the second ring portion may have at least two structure-stiffening features, wherein, in particular, the second ring portion may have a first structure-stiffening feature, which is situated radially at the inside and which has a first elevation, and at least one second structure-stiffening feature, which is situated radially at the outside and which has a second elevation. The first elevation and the second elevation may extend axially toward the turbine wheel, or the first elevation and the second elevation may extend axially toward the bearing housing, or the first elevation may extend axially toward the turbine wheel and the second elevation may extend axially toward the bearing housing.

In refinements, the turbine arrangement may furthermore comprise a variable turbine geometry for varying an incoming flow to the turbine wheel, which variable turbine geometry is arranged radially outside the turbine wheel and circumferentially surrounds the turbine wheel. The heat shield may be arranged in an axial direction between the variable turbine geometry and the bearing housing. In refinements, the variable turbine geometry may have a blade bearing ring for bearing multiple adjustable blades. The heat shield may be arranged between the blade bearing ring and the bearing housing.

In refinements, the first ring portion may make areal contact, at least in certain portions, with the blade bearing ring.

In refinements, the turbine arrangement may furthermore comprise a spring element that is designed to brace the variable turbine geometry against the turbine housing. The heat shield may be braced between the blade bearing ring and the spring element. In particular, the first ring portion may be braced between the blade bearing ring and the spring element. Here, the first ring portion may make areal contact, at least in certain portions, with the blade bearing ring and/or with a bearing portion of the spring element.

In refinements, the spring element may be a disk spring. The spring element may be supported on the bearing housing. In particular, the spring element may make linear contact with the bearing housing.

In refinements, the blade bearing ring may, radially at the inside on a side that faces toward the bearing housing, have a rabbet for receiving the heat shield.

In other refinements, the first ring portion may be braced between the bearing housing and the turbine housing.

In refinements, the bearing housing may have a turbine-side projection that extends in an axial direction toward the turbine wheel. The heat shield may be spaced apart in a radial direction and/or in an axial direction from the projection.

The projection may have a first shoulder radially at the inside, and may have a second shoulder radially at the outside in relation to the first shoulder. The spring element may be supported on a radial wall portion of the second shoulder.

According to a third aspect of the present invention, a supercharging device comprises a turbine arrangement according to the second aspect of the present invention. The supercharging device furthermore comprises a compressor with a compressor housing and with a compressor wheel arranged in said compressor housing. The compressor wheel is coupled to the shaft at an end of the shaft that is situated opposite the turbine wheel. The compressor housing is coupled to the bearing housing.

Furthermore, the supercharging device may also comprise an electric motor that may be arranged in a motor space in the bearing housing, wherein the turbine wheel and/or the compressor wheel may be coupled to the electric motor via the shaft.

According to a fourth aspect of the present invention, a method for producing a heat shield for a supercharging device comprises:
  a) providing a sheet-metal material,
  b) forming a first ring portion (110), which is situated at the outside in a radial direction (24) and which is designed to bear the heat shield (100), and a second ring portion (120), which is situated at the inside in a radial direction (24) and which extends from the first ring portion (110), on the sheet-metal material, c) forming at least one structure-stiffening feature (200) in the second ring portion (120), the structure-stiffening feature (200) being of bead-like form.

Here, the heat shield may have all of the refinements described above. In refinements, the at least one structure-stiffening feature may be formed by way of a deformation process, wherein, in particular, the deformation process may involve stamping and/or punching. In refinements, the method may furthermore comprise the step of punching out the sheet-metal material such that the latter is of ring-shaped form.

DETAILED DESCRIPTION

Figure 1:
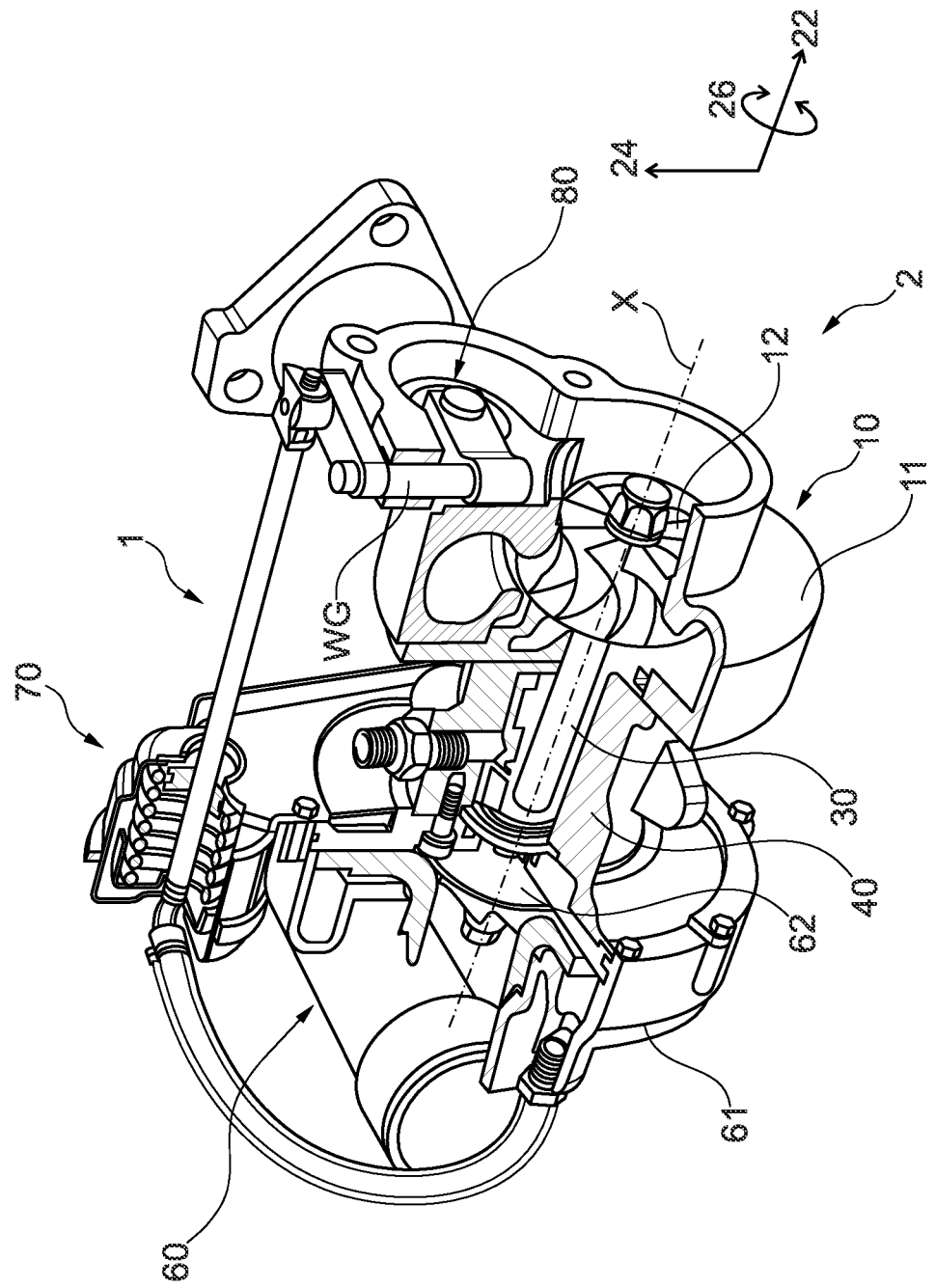
FIG. 1 shows an isometric view of an exemplary supercharging device with a turbine and with a compressor.

In the context of this application, the terms "axial" and "axial direction" relate to an axis of rotation X of the shaft 30 or of the turbine wheel 12. With regard to the figures (see for example FIGS. 1 to 8B), the axial direction is indicated by the reference designation 22. Here, a radial direction 24 relates to the axial direction 22. A circumference or a circumferential direction 26 likewise relates to the axial direction 22. The directions 22 and 24 run orthogonally with respect to one another.

FIG. 1 shows an exemplary supercharging device 1 which comprises a turbine arrangement 2 with a turbine 10 and with a bearing housing 40 and which comprises a compressor 60 and an actuator 70. The supercharging device 1 may in this case be a turbocharger. The turbine 10 comprises a turbine housing 11 in which a turbine wheel 12 is arranged. The supercharging device 1 furthermore comprises a shaft 30 with an axis of rotation X, which shaft is coupled to the turbine wheel 12. Here, the axial direction 22 is defined in relation to the axis of rotation X. The shaft 30 is mounted rotatably in the bearing housing 40, and the bearing housing 40 is coupled to the turbine housing 11. As shown in FIG. 1, the compressor 60 comprises a compressor housing 61 in which a compressor wheel 62 is arranged. The compressor wheel 62 is coupled to the shaft 30 at an end of the shaft 30 that is situated opposite the turbine wheel 12. FIG. 1 shows, by way of example, that the turbine arrangement 2 may comprise a power adjusting device in the form of a wastegate flap WG, which is provided for enabling a wastegate of the turbine 10 to be closed and opened as required. Here, the wastegate flap WG may be connected to the actuator 70 via a lever and/or a control rod. In refinements, the supercharging device 1 may furthermore comprise an electric motor (not shown in the Figs.), which may be arranged in a motor space in the bearing housing 40. Here, the turbine wheel 12 and/or the compressor wheel 62 may be coupled via the shaft 30 to the electric motor. The electric motor may have a rotor and a stator, wherein, in particular, the rotor may be arranged on the shaft 30, and wherein the stator surrounds the rotor. Furthermore, a power electronics circuit for controlling the electric motor may be arranged in a receiving space in the bearing housing 40.

Figure 2:
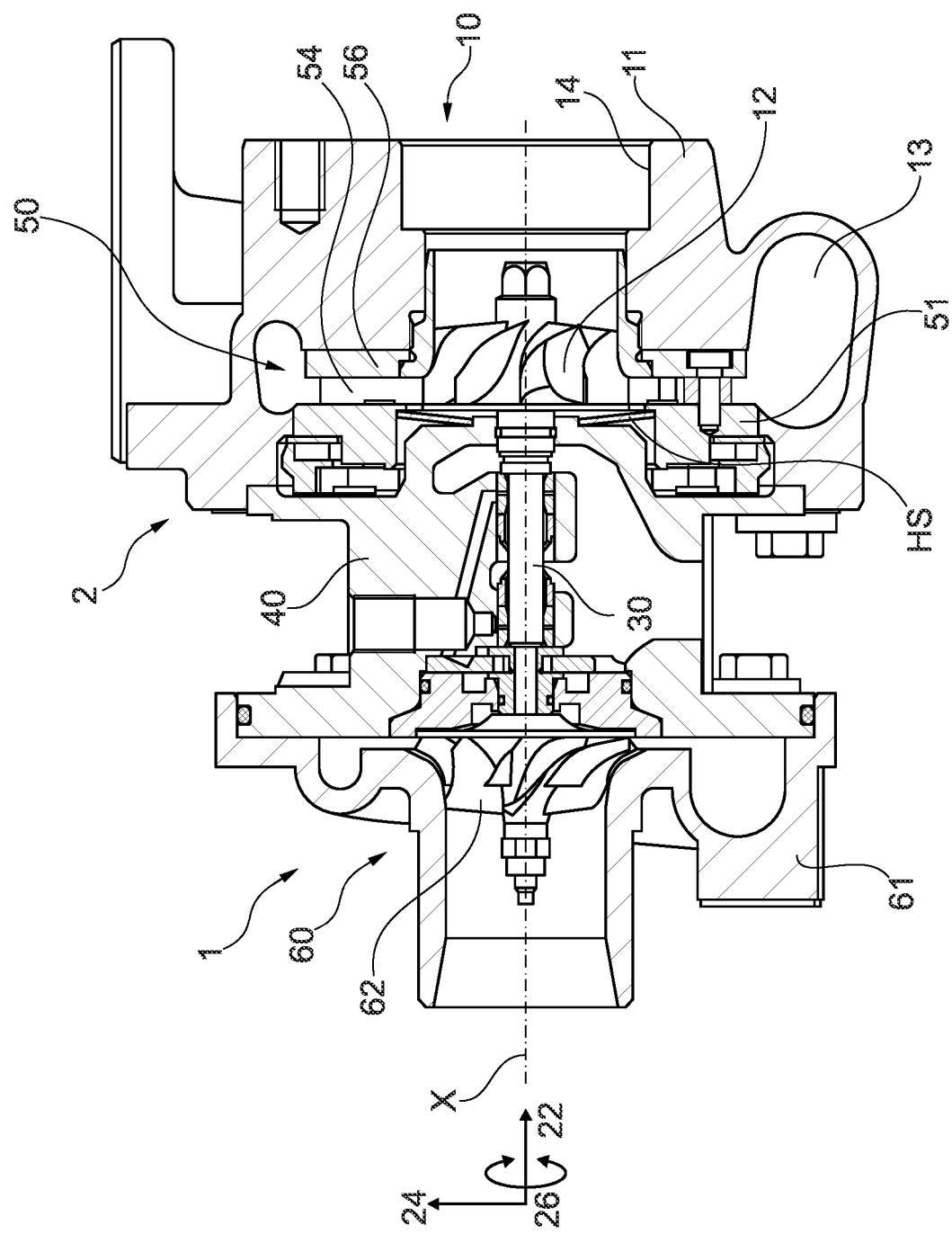
FIG. 2 shows a sectional view of the supercharging device with an exemplary heat shield.

FIG. 2 shows a sectional view of an exemplary turbine arrangement 2 with a power adjusting device in the form of a variable turbine geometry 50 for varying an incoming flow to the turbine wheel 10. The variable turbine geometry 50 is arranged radially outside the turbine wheel 12 and circumferentially surrounds the turbine wheel 12. Here, the variable turbine geometry 50 is provided as a cartridge that is installed in the turbine housing 11. The variable turbine geometry 50 has a blade bearing ring 51 for bearing multiple adjustable blades 54, which can be adjusted by means of an adjusting ring 55. Opposite the blade bearing ring 51, the variable turbine geometry 50 has a cover ring 56. The adjustable blades 54 are arranged between the blade bearing ring 51 and the cover ring 56 in a flow channel that is defined there. The adjusting ring 55 may be connected via one or more levers and/or a control rod to the actuator 70 (not shown in FIG. 2). Also illustrated in FIG. 2 is an exemplary heat shield HS which is arranged in an axial direction 22 between the blade bearing ring 51 and the bearing housing 40. The exemplary heat shield HS is provided between the bearing housing 40 and turbine wheel 12 in order to protect the bearing housing 40 and the bearing arrangement of the shaft 30 against heat transfer that can occur from hot fluid (for example hot exhaust gas). However, this heat shield HS does not have the features according to the invention, and vibration and/or deformation or failure can occur. The turbine 11 furthermore has a turbine volute 13 upstream of the turbine wheel 12, which turbine volute may extend in spiral fashion. Downstream of the turbine wheel 12, the turbine has a turbine outlet 14. Also illustrated in FIG. 2 is the compressor 60, which is coupled to the bearing housing 40.

FIGS. 3A to 8B show various refinements of a heat shield 100 according to the invention. The heat shield 100 comprises a first ring portion 110, which is situated at the outside in a radial direction 24 and which is designed to bear the heat shield 100, and a second ring portion 120, which is situated at the inside in the radial direction 24 and which extends from the first ring portion 110. In other words, the heat shield 100 is of disk-like form (though the disk need not run in one plane throughout). The second ring portion 120 has at least one structure-stiffening feature 200, the at least one structure-stiffening feature 200 being of bead-like form. By virtue of the second ring portion 120 of the heat shield 100 having at least one structure-stiffening feature 200 that is of bead-like form, it is possible to achieve greater stiffness and/or stability or robustness of the heat shield 100, and thus a structure which is more robust with respect to high pressures and/or temperatures. Furthermore, the risk of failure of individual components, for example of the heat shield 100 and/or of the turbine wheel 12 or of further components in the turbine 10, can be reduced or prevented. Here, a "structure-stiffening feature 200" can be understood to mean a structure that leads to stiffening, and thus an improvement in stability/robustness, of the heat shield 100, in particular with regard to deformation and/or vibration of the heat shield 100 in an axial direction 22. Various refinements of the heat shield 100 according to the invention will be described in detail further below.

Figure 3A:
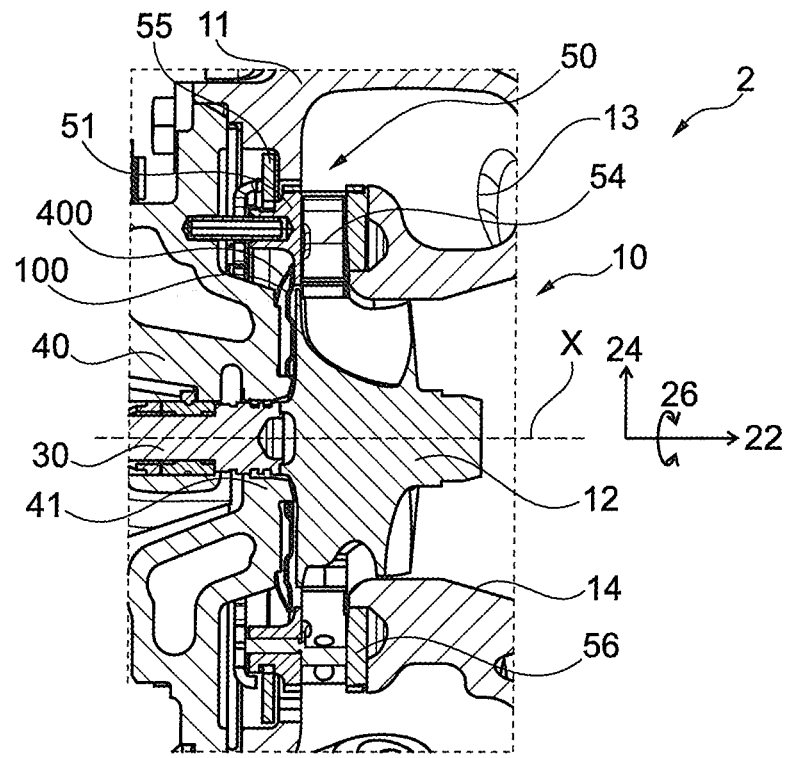
FIGS. 3A, 3B show a sectional view of the turbine arrangement according to the invention with a VTG and with a heat shield according to the invention according to a first refinement.
Figure 3B:
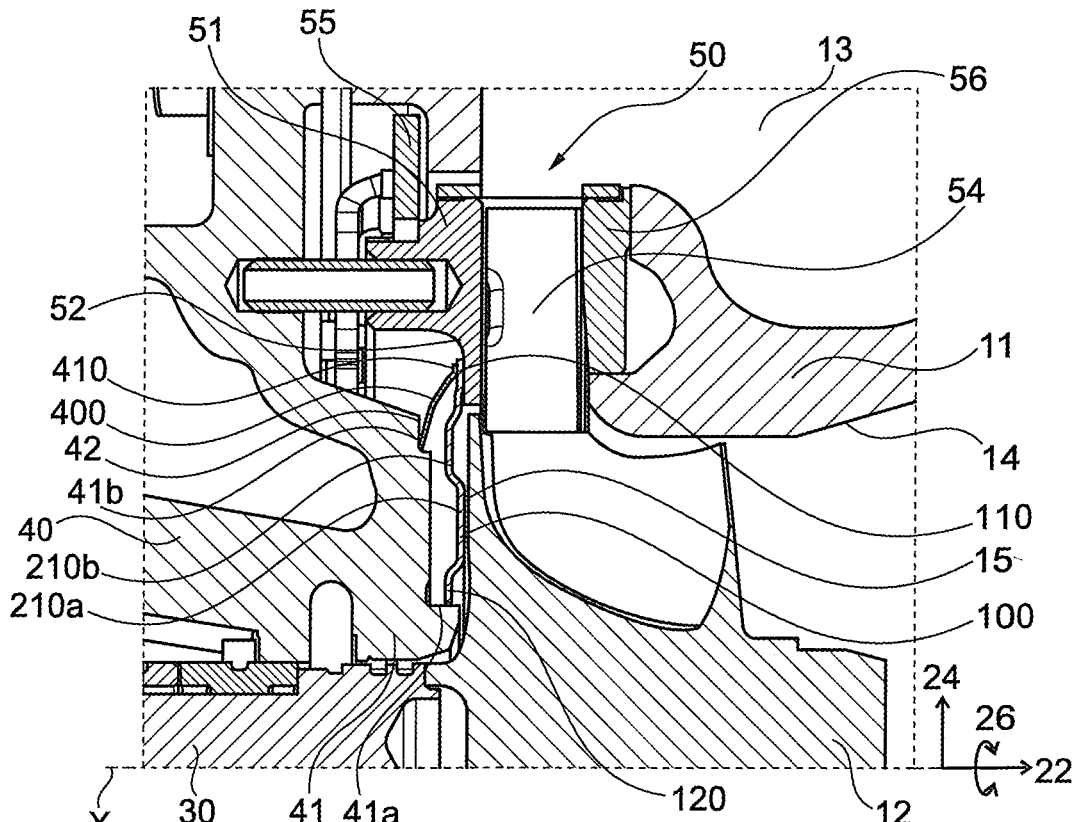
Figure 5A:
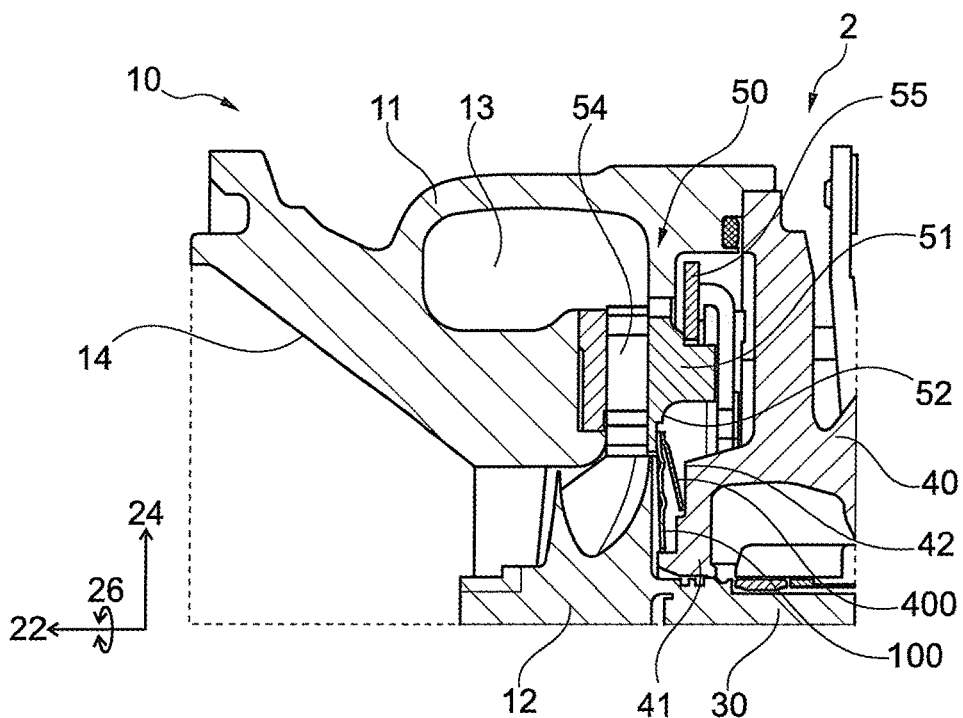
FIGS. 5A, 5B show a sectional view of a turbine arrangement according to the invention with a VTG and with a heat shield according to the invention according to a second refinement.
Figure 5B:
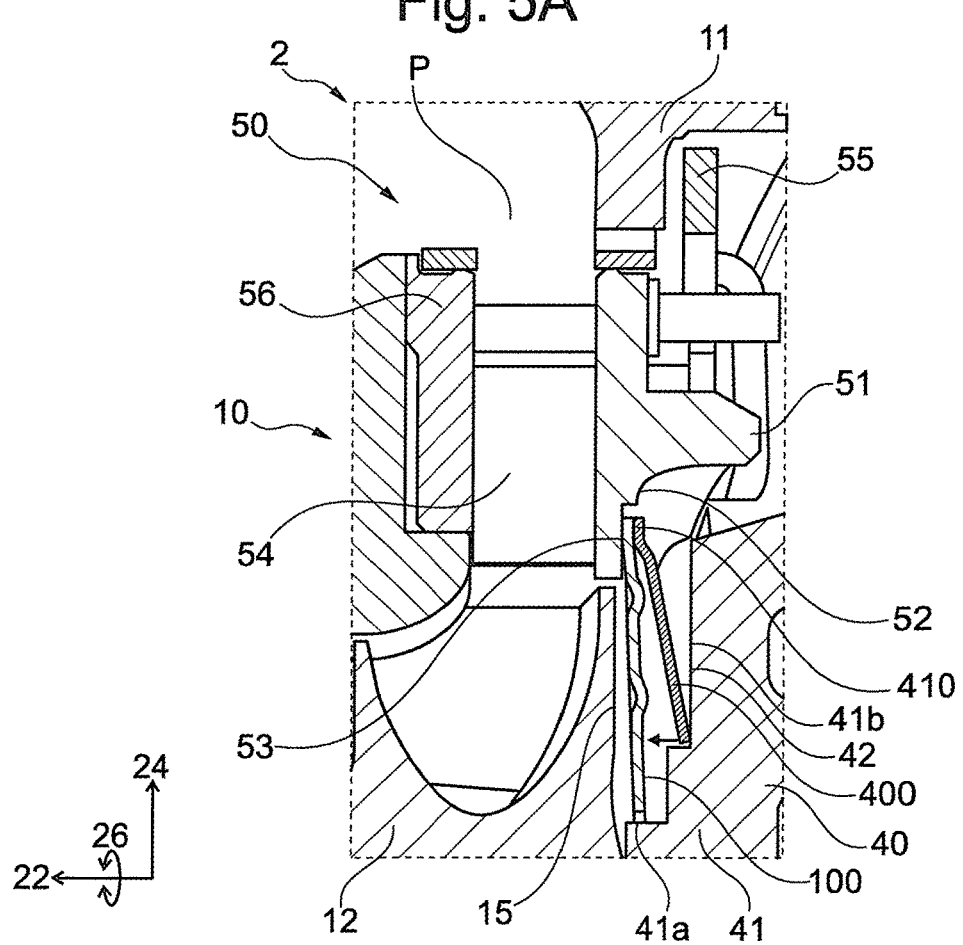

FIGS. 3A and 3B show a more detailed sectional view of a turbine arrangement 2 according to the invention, with a turbine which is coupled to a bearing housing 40, with a variable turbine geometry 50, and with a heat shield 100 according to the invention according to a first refinement. FIGS. 5A and 5B show a turbine arrangement 2 with a heat shield 100 according to the invention according to a second refinement. The heat shield 100 is arranged in an axial direction 22 between the turbine wheel 12 and the bearing housing 40, in particular between the variable turbine geometry 50 and the bearing housing 40. More specifically, in this exemplary embodiment, the heat shield 100 is arranged between the blade bearing ring 51 and the bearing housing 40. The heat shield 100 has a first side surface 101 and an oppositely situated second side surface 102, the first side surface 101 facing toward the turbine wheel 12, and the second side surface 102 facing toward the bearing housing 40. As shown in FIGS. 3A, 3B, 5A and 5B, the first ring portion 110 thus makes areal contact at least in certain portions with the blade bearing ring 51, in particular with a side 52 of the blade bearing ring 51 that faces toward the bearing housing 40. The turbine arrangement 2 furthermore comprises a spring element 400, the heat shield 100 being braced between the blade bearing ring 51 and the spring element 400. In refinements, the first ring portion 110 is braced between the blade bearing ring 51 and the spring element 400. In particular, the first ring portion 110 makes areal contact, at least in certain portions, with the blade bearing ring 51 and/or with a bearing portion 410 of the spring element 400. Here, the spring element 400 is supported on the bearing housing 40. In the refinement shown in FIGS. 3A, 3B, 5A and 5B, the spring element 400 may be a disk spring. The spring element 400 is designed to brace the variable turbine geometry 50 against the turbine housing 11 in an axial direction 22. Here, the spring element 400 may make linear contact with the bearing housing 40. The heat shield 100 may comprise a sheet-metal material. Here, the sheet-metal material may be an austenitic steel. In other refinements, the sheet-metal material may have a nickel-based material. Here, the sheet-metal material may have a spring stiffness c of between 0.2 kN/mm and 1.8 kN/mm, preferably between 0.5 kN/mm and 1.5 kN/mm, particularly preferably between 0.6 kN/mm and 1.2 kN/mm.

Figure 7A:
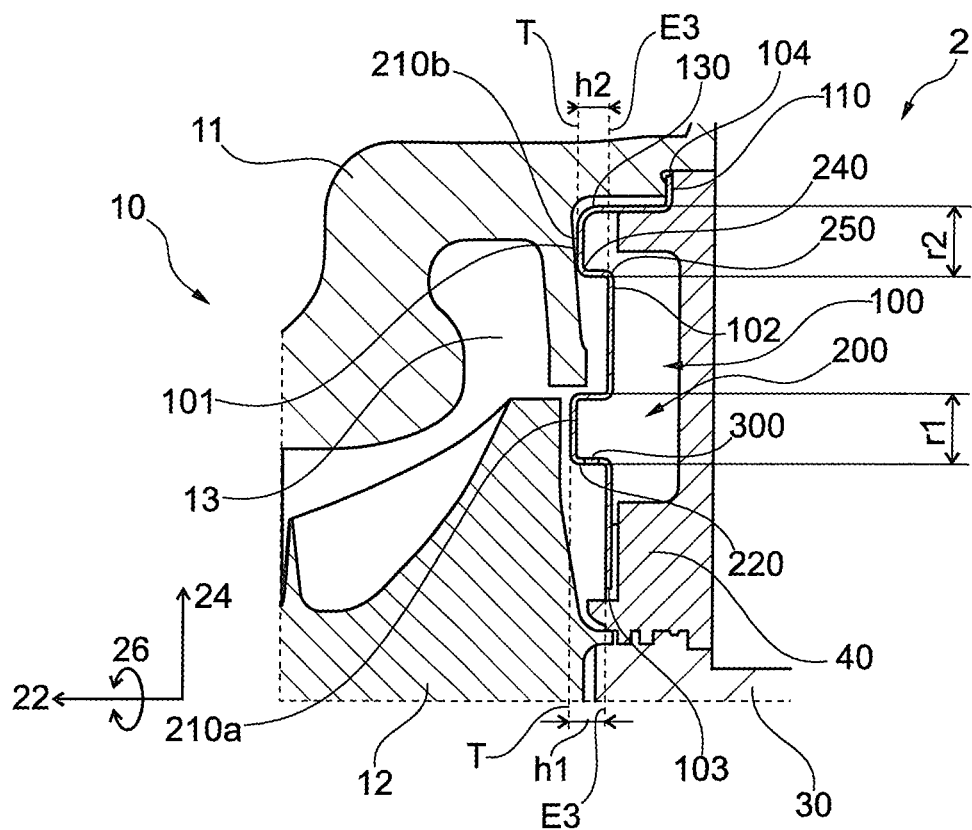
FIGS. 7A, 7B show a sectional view of a turbine arrangement according to the invention without a VTG, and a sectional view and front view of a heat shield according to the invention according to a third refinement.
Figure 7B:
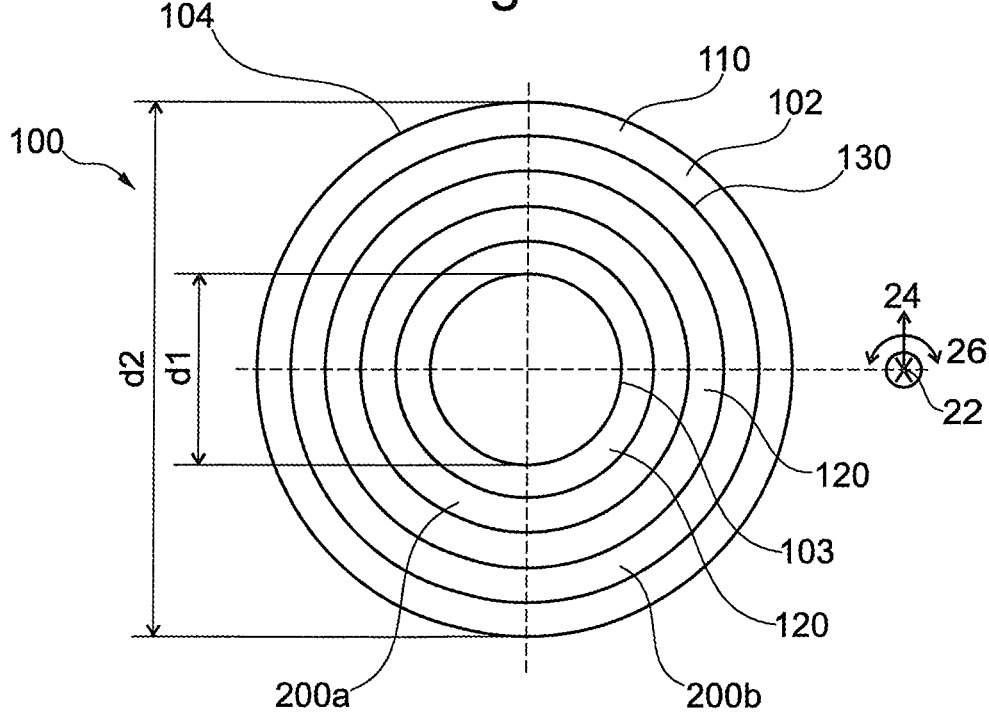

In another refinement of a turbine arrangement 2 according to the invention as shown in FIG. 7A, the heat shield 100, in particular the first ring portion 110, may however also be braced between bearing housing 40 and turbine housing 12. This may also be provided in refinements in which a variable turbine geometry 50 is provided in the turbine 10 (although this is not shown in FIG. 7A). Here, the heat shield 100 may be arranged in an axial direction 22 between the variable turbine geometry 50, in particular the adjusting ring 55, and the bearing housing 40 and extend in a radial direction 24. Additionally, a sealing element may be provided in an axial direction 22 between the first ring portion 110 and the turbine housing 12 and/or the bearing housing 40 in order to form a seal between turbine housing 12 and bearing housing 40 (not shown in FIG. 7A).

With regard to FIGS. 5A and 5B, in one refinement, the blade bearing ring 51 may, radially at the inside on a side 52 that faces toward the bearing housing 40, have a rabbet 53 for receiving the heat shield 100. Here, centering of the heat shield 100 may be realized by means of a radial delimitation of the rabbet 53 (that is to say an axial portion of the rabbet 53) when said heat shield is arranged in the rabbet 53. In particular, the first ring portion 110 may, at least in certain portions, make areal contact with a portion of the rabbet 53 that extends in a radial direction 24.

The bearing housing 40 has a turbine-side projection 41 (see FIGS. 3A and 3B) that extends in an axial direction 22 toward the turbine wheel 12. The heat shield 100 may be spaced apart in a radial direction 24 and/or in an axial direction 22 from the projection 41. Centering of the heat shield 100 in a radial direction 24 may also be realized by means of the projection 41, for example if the rabbet 53 is not provided. The spring element 400 may be borne on the projection 41. More specifically, the projection 41 has a first shoulder 41a, which is situated radially at the inside and which is adjacent to the turbine wheel 12, and a second shoulder 41b, which is situated radially at the outside in relation to the first shoulder 41a and which is arranged in an axial direction 22 between the first shoulder 41a and the bearing housing. The spring element 400 may be supported on a radial wall portion 42 of the second shoulder 41b. Here, the spring element 400 may be arranged so as to be spaced apart in a radial direction 24 from the projection 41. High pressure levels and temperatures may also prevail behind the spring element 400 in certain operating ranges of the turbine arrangement 2. Owing to the design of the heat shield 100 according to the invention as shown for example in FIGS. 3A and 3B, said heat shield however has increased stiffness and/or stability or robustness with respect to movement, deformation and/or failure (in particular in an axial direction 22), such that damage to the heat shield 100 and/or to the turbine wheel 12 can be reduced or prevented. This may be provided even if the spring element 400 loses axial contact with the bearing housing 40 (owing to the high pressure and/or the high temperature, see for example the black arrow in FIG. 5B), as a result of which a pressure level between the spring element 400 and the heat shield 100 can increase, and a pressure impulse can act on the heat shield 100.

Various refinements of the heat shield 100 according to the invention will be described below on the basis of FIGS. 4A, 4B and 6A to 8B. Here, those refinements of the heat shield 100 and of the structure-stiffening feature 200 which are specifically described and shown in the individual Figs. may be combined with the respective other refinements that are described and shown. As shown in FIGS. 4A, 4B and 6A to 8B, the at least one structure-stiffening feature 200 has an elevation 210 which is connected via an axial wall portion 220 to the second ring portion 120. The at least one structure-stiffening feature 200 furthermore has a depression 230, which is arranged on an opposite side of the heat shield 100, in particular of the second ring portion 120, in relation to the elevation 210. In other words, the bead-like form of the at least one structure-stiffening feature 200 may be defined by the elevation 210 and the oppositely situated depression 230. The at least one structure-stiffening feature 200 may be arranged on the second ring portion 120 such that, when the heat shield 100 is arranged in an axial direction 22 between the turbine wheel 12, which is arranged in the turbine housing 11, and the bearing housing 40, which is coupled to the turbine housing 11, the elevation 210 may extend axially toward the turbine wheel 12 (see for example the elevation 210a in FIG. 3B) or the elevation 210 may extend axially toward the bearing housing 40 (see for example FIG. 5B). If the elevation 210 extends toward the turbine wheel 12, an adequate axial spacing in an axial direction 22 to the turbine wheel 12 and/or to the bearing housing 40 (in particular to the projection 41) can be provided owing to the available installation space.

The heat shield 100 has an inside edge 103 with an inner diameter d1 and an outside edge 104 with an outer diameter d2. The second ring portion 120 extends at an angle with respect to the first ring portion 110, the second ring portion 120 in particular being conical with respect to the first ring portion 110. The heat shield 100 has a first side surface 101 and a second side surface 102 that is arranged opposite the first side surface 101. The heat shield 100 has a first plane E1, which runs through the first ring portion 110 at the first side surface 101 and which is arranged orthogonally with respect to the axial direction 22. Furthermore, the heat shield 100 has a second plane E2 which is arranged so as to be spaced apart in an axial direction 22 from, and parallel to, the first plane E1. The second ring portion 120 may extend axially as far as the second plane E2.

FIGS. 4A, 4B and 6A to 7B show a heat shield 100 according to the invention according to a first, second and third refinement. Here, the at least one structure-stiffening feature 200 may extend at least in certain portions in a circumferential direction 26. In other words, in this refinement, the at least one structure-stiffening feature 200 may extend with its long side in a circumferential direction 26. In particular, the structure-stiffening feature 200 may in this case extend on a circular path which has a constant radius (measured from the axial direction 22) in the radial direction 24. In other refinements, the radius of the circular path may also vary in a circumferential direction 26. For example, two end points, spaced apart in a radial direction 24, of the at least one structure-stiffening feature 200 may be arranged at different positions in a circumferential direction 26. Here, the at least one structure-stiffening feature 200 may be of arcuate form in a plane that runs orthogonally with respect to the axial direction 22. As shown in FIGS. 4A, 4B and 6A to 7B, the at least one structure-stiffening feature 200 may extend in encircling fashion in a circumferential direction 26. Here, the at least one structure-stiffening feature 200 runs concentrically with respect to the heat shield 100, in particular with respect to the second ring portion 120. In other refinements (not shown in the Figs.), the encircling structure-stiffening feature 200 may however run on a circular path that has a varying radius.

Figure 8A:
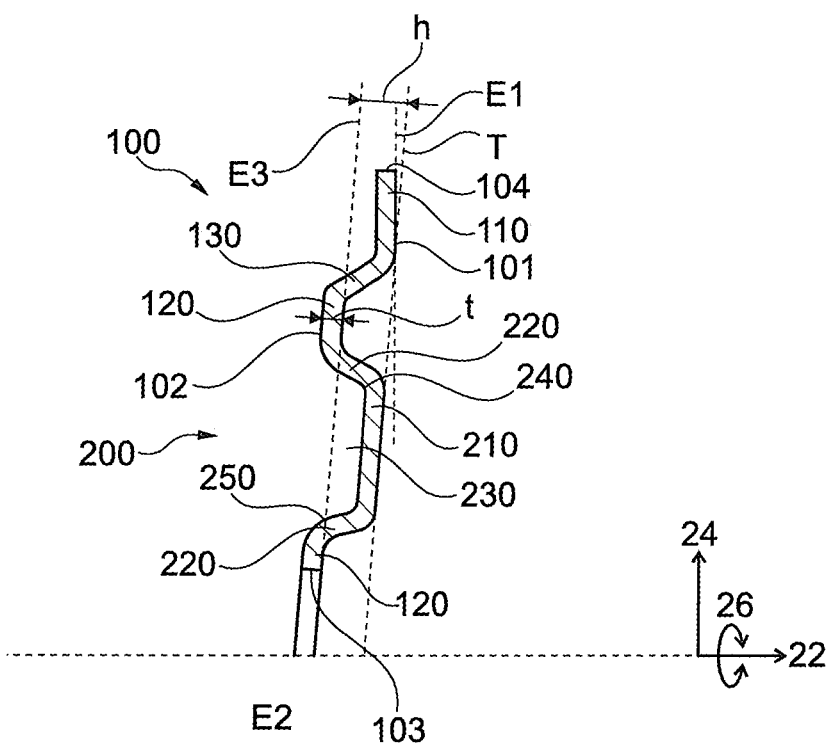
FIGS. 8A, 8B show a sectional view and a front view of a heat shield according to the invention according to a fourth refinement.
Figure 8B:
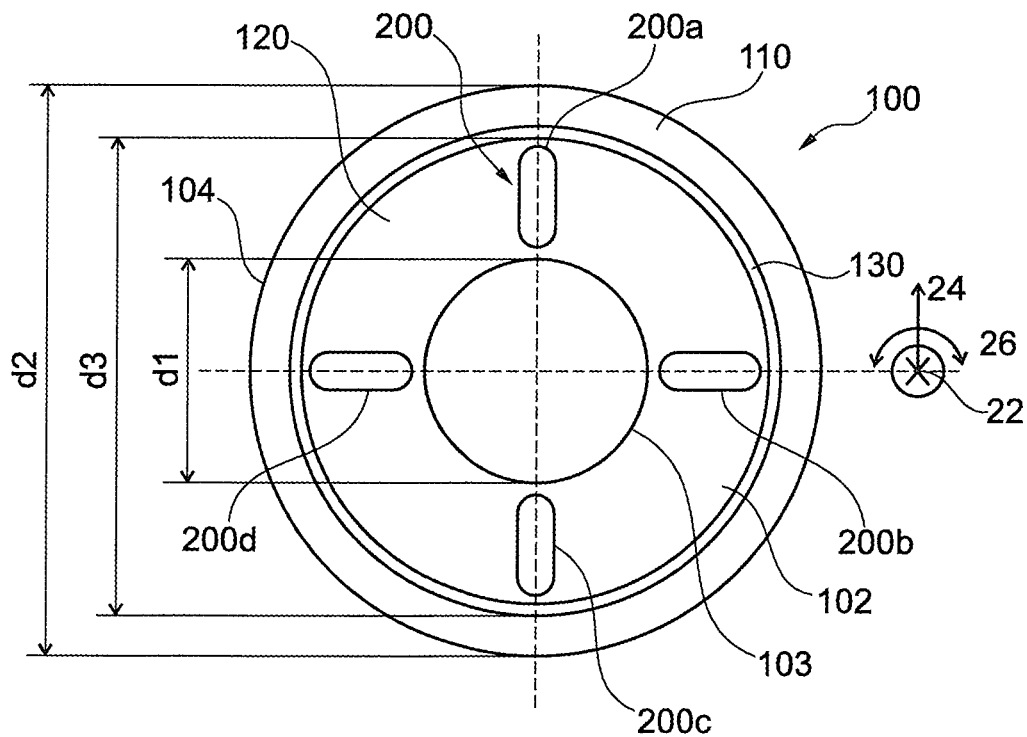

FIGS. 8A and 8B show a sectional view and a front view of a heat shield 100 according to the invention according to a fourth refinement. In this refinement, the at least one structure-stiffening feature 200 is of elongate form and extends in a radial direction 24. In other words, the at least one structure-stiffening feature 200 extends with its long side in a radial direction 24. In particular, the at least one structure-stiffening feature 200 may extend rectilinearly in a radial direction 24. Furthermore, the at least one structure-stiffening feature 200 is formed, at least in certain portions, in a circumferential direction 26, wherein, in the refinements of FIGS. 8A and 8B, said structure-stiffening feature has a width that can be measured tangentially with respect to the circumferential direction 26. Here, the at least one structure-stiffening feature 200 may be of rounded form at its respective ends, in particular as viewed in a plane that runs orthogonally with respect to the axial direction 22. The at least one structure-stiffening feature 200 may also be of rectilinear form and extend obliquely on the second ring portion 120. Here, "obliquely" means that two end points, spaced apart in a radial direction 24, of the at least one structure-stiffening feature 200 may be arranged at different positions in a circumferential direction 26. In the above-described refinements as shown in FIGS. 4A to 8B, the at least one structure-stiffening feature 200 may extend in the radial direction 24 over more than 50% of a radial extent of the second ring portion 120.

As can be seen in FIGS. 4A, 6A, 7A and 8A, the first ring portion 110 is of planar form at least in certain portions. The planar portion of the first ring portion 110 may extend in the radial direction 22 in the first plane E1. The first ring portion 110 and the second ring portion 120 are connected by a third ring portion 130, wherein, in particular, the third ring portion 130 may be of conical and/or arcuate form with respect to the first ring portion 110. In refinements, the third ring portion 120 may have a convex and/or a concave sub-portion in relation to the first ring portion 110. As shown for example in FIG. 8B, the second ring portion 120 thus extends as far as an intermediate diameter d3 as measured in a radial direction 24, a ratio of the intermediate diameter d3 to the outer diameter d2 being at least 0.7.

The elevation 210 extends as far as a maximum elevation height h (see for example FIG. 8A), the maximum elevation height h being measured between a third plane E3, which runs on a side surface 101, 102, facing toward the elevation 210, of the second ring portion 120, and a tangent T to the maximum height of the elevation 210, which tangent runs parallel to said third plane (see FIGS. 4A, 6A, 7A, 8A). In particular, the maximum elevation height h is measured orthogonally with respect to the plane E3. In other words, the maximum elevation height h may be measured orthogonally with respect to a reference shape of the second ring portion 120 (that is to say a shape of the second ring portion 120 without structure-stiffening feature(s)) between a side surface 101, 102 of the reference shape and a tangent T to the maximum height of the at least one structure-stiffening feature 200 (in particular of the elevation 210), which tangent is parallel to said side surface. The heat shield 100 has a material thickness t that may be approximately constant in a radial direction 24. Owing to tolerances of a raw material and manufacturing-induced tolerances, the material thickness t may vary in a radial direction 24 (in particular for example in the region of radii). Here, the material thickness t of the heat shield 100 may vary by at most 30%. The at least one structure-stiffening feature 200 may be formed on the second ring portion 120 such that the material thickness t thereof changes by at most 20% in relation to the material thickness t in regions of the second ring portion 120 adjacent to the at least one structure-stiffening feature 200. In refinements, the second ring portion 120 may have an approximately constant material thickness t. A ratio of the maximum elevation height h to the material thickness t, in particular of the second ring portion 120, may be between 0.40 and 2.80, in particular between 0.60 and 2.50 (see FIGS. 4A, 6A, 8A). In refinements, the ratio may be between 1.00 and 2.50, in particular between 1.70 and 2.30. In other refinements, the ratio may be between 0.60 and 1.80, in particular between 1.10 and 1.40. In refinements, a maximum elevation height h may be between 0.2 mm and 1.1 mm, in particular between 0.30 mm and 1.00 mm. In other refinements, the maximum elevation height h may be greater than the material thickness t of the second ring portion 120, wherein, in particular, the maximum elevation height h may be at least two times, preferably three times, greater than the material thickness t (see FIG. 7A).

Figure 4A:
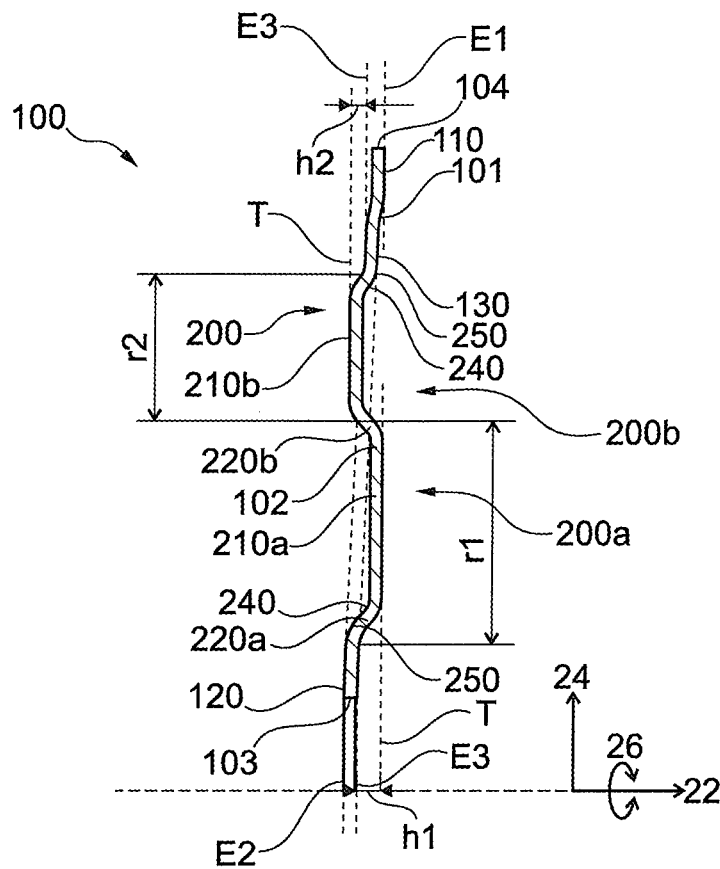
FIGS. 4A, 4B show a sectional view and a front view of a heat shield according to the invention according to a first refinement.

As can be seen in FIGS. 4A, 6A, 7A and 8A, the at least one structure-stiffening feature 200 may be of arcuate form at least in certain portions in cross section. In particular, the elevation 210 and/or the axial wall portion 220 may be of arcuate form at least in certain portions. Here, the cross section may lie in a plane that is defined by the axial direction 22 and the radial direction 24. In refinements, the axial wall portion 220 may have a concave and/or a convex sub-portion in relation to the second ring portion 120. In the refinements of the heat shield 100 according to the invention as shown in FIGS. 4A, 7A and 8A, the at least one structure-stiffening feature 200 may be of planar form at least in certain portions in cross section, wherein, in particular, the elevation 210 and/or the axial wall portion 220 may be of planar form at least in certain portions in cross section. If the elevation 210 is of planar form at least in certain portions in cross section, the planar portion of the elevation 210 may run in a plane that is parallel or at an angle with respect to the second ring portion 120. The axial wall portion 220 may also be of planar form at least in certain portions in cross section. The planar portion of the wall portion 220 may in this case be substantially orthogonal (see for example FIG. 7A) or conical with respect to the second ring portion 120.

Figure 6A:
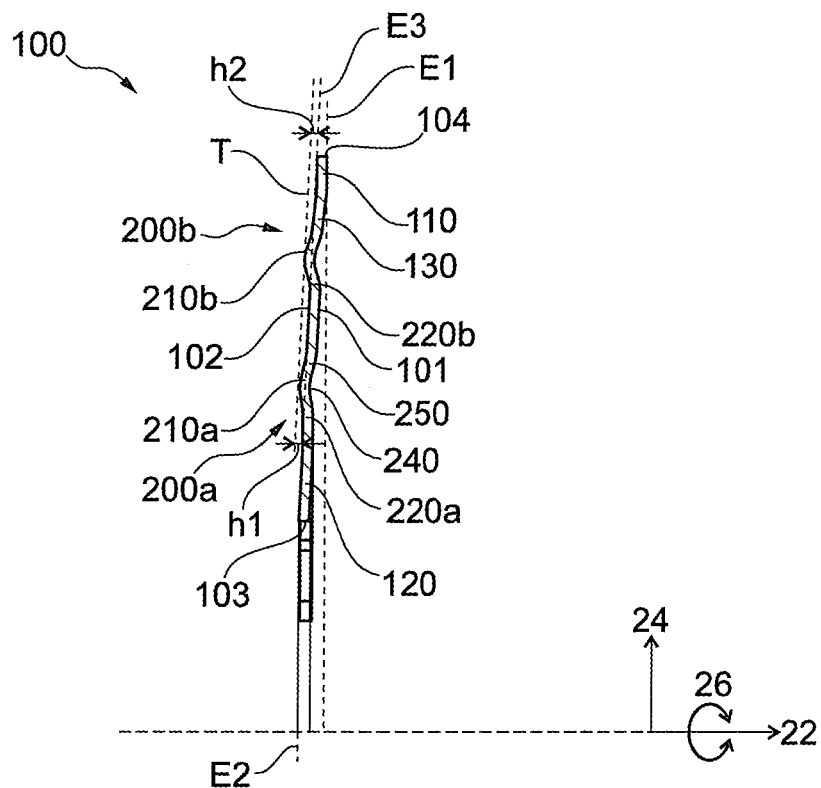
FIGS. 6A, 6B show a sectional view and a front view of a heat shield according to the invention according to a second refinement.
Figure 6B:
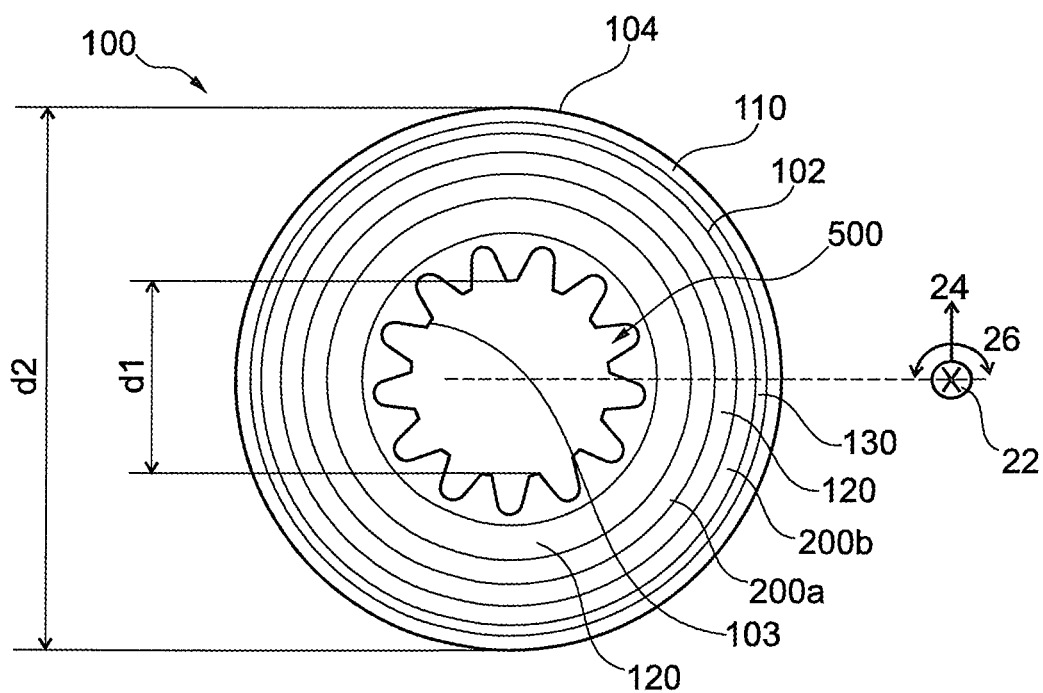

FIGS. 6A and 6B show a sectional view and a front view of a heat shield according to the invention according to a third refinement. In this refinement, the at least one structure-stiffening feature 200 is of arcuate (that is to say undulating) form throughout in cross section. In particular, in this case, the elevation 210 and the axial wall portion 220 are of arcuate form throughout. This refinement may self-evidently also be combined with the other illustrated refinements of the heat shield 100. For example, the first refinement of the heat shield 100 as per FIGS. 8A and 8B may likewise have a structure-stiffening feature 200 that is of arcuate form throughout in cross section.

On a side of the elevation 210 that faces toward the second ring portion 120, in particular between the elevation 210 and axial wall portion 220, the at least one structure-stiffening feature 200 has an inner radius 240 (see FIGS. 4A, 6A, 7A, 8A). The inner radius 240 may be between 0.2 mm and 1.6 mm, in particular between 0.3 mm and 1.2 mm. In a particularly preferred refinement, the inner radius 240 may be between 0.8 mm and 1.2 mm, in particular between 0.9 mm and 1.0 mm. The above-stated ranges of the inner radius 240 can provide a high stiffness and thus improved stability and robustness of the heat shield 100. Furthermore, a transition radius 250 on a side of the elevation 220 that faces toward the second ring portion 120, between the second ring portion 120 and the at least one structure-stiffening feature 200, in particular between the second ring portion 120 and the wall portion 220, is equal to or greater than the inner radius 240. In other refinements, the transition radius 250 may however also be smaller than the inner radius 240. The geometry of the heat shield and the cross-sectional shape (for example ring portions 110, 120, 130, elevation 210, or radii 240, 250) are in this case configured such that the heat shield can be produced by deformation and/or precision cutting. Here, deformation may encompass punching and/or stamping.

Figure 4B:
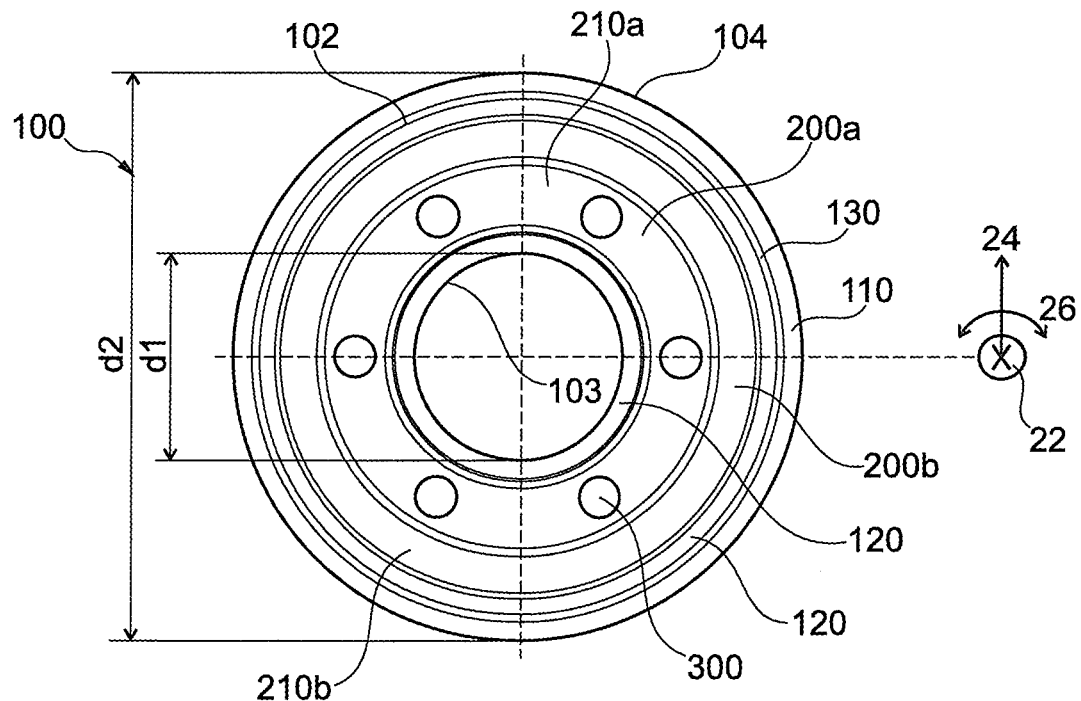

In the refinements of the heat shield 100 of FIGS. 4B and 7A, the second ring portion 120 may have multiple openings 300 that are spaced apart from one another in the circumferential direction 26. The multiple openings 300 may extend between the first side surface 101 and the second side surface 102. In one refinement, each opening of the multiple openings 300 may be a through bore. Each opening of the multiple openings 300 may be circular or oval. In one refinement, oval and/or circular openings may be provided. The multiple openings 300 may also be of elongate form and extend in a circumferential direction 26. For example, here, each opening of the multiple openings 300 may be in the form of an elongated hole. It is also possible for only one opening to be provided, which may have the described refinements. The multiple openings 300 may be spaced apart uniformly from one another in the circumferential direction 26 and/or may have the same spacing in a radial direction 24 to the axis 22 (in particular the axis of rotation X of the shaft 30). Alternatively, the multiple openings 300 may also be spaced apart non-uniformly in a circumferential direction 26. Pressure equalization or pressure relief on a side of the heat shield 100 that faces toward the bearing housing 40 can be achieved by means of the multiple openings 300, because fluid can escape through the multiple openings 300 from a position on a side of the heat shield 100 that faces toward the bearing housing 40 (that is to say the second side surface 102). In refinements, two, three, four, five, six, seven or more openings 300 may be provided. In a preferred refinement, six openings 300 may be provided. In refinements, each opening of the multiple openings 300 may have a diameter of between 1.0 mm and 6.0 mm. In refinements, the diameter may be between 2.0 mm and 5.0 mm, in particular between 2.5 mm and 4.5 mm. In particularly preferred refinements, the diameter may be between 3.0 and 4.0 mm. As shown in FIGS. 4B and 7A, the multiple openings 300 may be arranged in the elevation 210 and/or in the axial wall portion 220. Additionally or alternatively, the multiple openings 300 may be arranged in the second ring portion 120, for example in a sub-portion of the second ring portion that does not have the elevation 210 and/or the axial wall portion 220. If the multiple openings 300 are arranged in the elevation 210, said openings extend substantially in the axial direction 22. If the multiple openings 300 are arranged in the axial wall portion 220, said openings extend substantially in a radial direction 24. In refinements, the multiple openings 300 may be arranged at a radially inner side of the wall portion 220 (see FIG. 7A). Even though the multiple openings 300 are shown only in FIGS. 4B and 7A, they may also be provided in all other refinements of the heat shield 100.

Additionally or alternatively, the heat shield 100 may, at the inside edge 103, have multiple cutouts 500 that extend in a radial direction 24 from the inside edge 103, wherein, in particular, the multiple cutouts 500 may be spaced apart uniformly in a circumferential direction 26 (see FIG. 6B). Here, the multiple cutouts 500 may be of sun-shaped or toothed-ring-shaped configuration. Similarly to the situation with the multiple openings 300, pressure equalization and/or pressure relief on a side of the heat shield 100 that faces toward the bearing housing 40 (that is to say the second side surface 102) can also be provided by means of the multiple cutouts 500. Even though the multiple cutouts 500 are shown only in FIG. 6B, they may also be provided in all other refinements of the heat shield 100. If the at least one structure-stiffening feature 200 extends toward the turbine wheel 12, and if the multiple openings 300 and/or the multiple cutouts 500 are provided, an adequate axial spacing of the multiple openings 300 and/or of the multiple cutouts 300 to the bearing housing 40 and/or to the turbine wheel 12 can be provided in order to be able to provide effective pressure relief or pressure equalization.

In the refinements of FIGS. 3A to 8B, the second ring portion 120 of the heat shield 100 has at least two structure-stiffening features 200a, 200b, the at least two structure-stiffening features 200a, 200b in particular each being of bead-like form. The at least two structure-stiffening features 200a, 200b may each have the refinements described above. A combination of the refinements described above is also possible. Here, the number of structure-stiffening features 200 on the heat shield 100 may be dependent on the structural size and the materials of the heat shield 100. As shown for example in the refinement in FIG. 8B, the at least two structure-stiffening features 200a, 200c or the at least two structure-stiffening features 200b, 200d may, in refinements, be spaced apart uniformly from one another in a circumferential direction 26. In this refinement, four structure-stiffening features 200a, 200b, 200c, 200d are provided, which are spaced apart from one another uniformly in a circumferential direction 26. In a radial direction 24, the four structure-stiffening features 200a, 200b, 200c, 200d may each have the same radial spacing to the axis 22. In the refinements of FIGS. 3A to 7B, the at least two structure-stiffening features 200a, 200b are spaced apart from one another in a radial direction 24. Here, the at least two structure-stiffening features 200a, 200b may be arranged adjacent to one another in a radial direction 24. The second ring portion 120 may have a first structure-stiffening feature 200a, which is situated radially at the inside and which has a first elevation 210a, and at least one second structure-stiffening feature 200b, which is situated radially at the outside and which has a second elevation 210b. Specifically in the refinements of FIGS. 3A to 7B, exactly two structure-stiffening features 200a, 200b are provided. If the at least two structure-stiffening features 200a, 200b extend only in certain portions in a circumferential direction 26, said structure-stiffening features may also be arranged at different positions in a circumferential direction, for example oppositely, as viewed in a plane orthogonal to the axial direction 22. Here, the at least two structure-stiffening features 200a, 200b may run on a respective circular path of constant radius. In other refinements, the radius may however also vary along the length of a structure-stiffening feature 200a, 200b. If the at least two structure-stiffening features 200a, 200b are arranged in encircling fashion in a circumferential direction 26, said structure-stiffening features may each run on a circular path that is arranged concentrically with respect to the heat shield 100. In other refinements, the circular path may vary in a radial direction 24. The first elevation 210a has an oppositely situated first depression 230a, and the second elevation 210b has an oppositely situated second depression 230b. As viewed in a radial direction 24 from the axis 22, the heat shield 100 may have a first sub-portion of the second ring portion 120, followed by the first elevation 210a, followed by the elevation 210b, followed by a second sub-portion of the second ring portion 120. In other refinements, a third sub-portion of the second ring portion 120 may also be arranged in a radial direction 24 between the first elevation 210a and the second elevation 210b.

In the refinements of FIGS. 5A to 7B, the first elevation 210a and the second elevation 210b are arranged on the same side surface 101, 102 of the heat shield 100. In other words, the first elevation 210a and the second elevation 210b may extend axially from the first side surface 101 and/or from the second side surface 102. The first depression 230a and the second depression 230b are arranged on the respective other side surface 101, 102 of the heat shield 100. Here, the first elevation 210a and the second elevation 210b may be arranged on the first side surface 101 of the heat shield 100 (see for example FIG. 7A). Alternatively, the first elevation 210a and the second elevation 210b may be arranged on the second side surface 102 of the heat shield 100 (see for example FIG. 6A). In the refinement of FIGS. 4A and 4B, the first elevation 210a and the second elevation 210b are arranged on different side surfaces 101, 102 of the heat shield 100.

Here, the first elevation 210a may be arranged on the first side surface 101 and the second elevation 210b may be arranged on the second side surface 102. Depending on the installation space available in the turbine 10, it is however alternatively also possible for the first elevation 210a to be arranged on the second side surface 102 and for the second elevation 210b to be arranged on the first side surface 101 (not shown in the Figs.).

In refinements, the first elevation 210a and the second elevation 210b may be arranged on the second ring portion 120 such that, when the heat shield 100 is arranged in an axial direction 22 between a turbine wheel 12, which is arranged in the turbine housing 11, and the bearing housing 40, which is coupled to the turbine housing 11, the first elevation 210a and the second elevation 210b extend axially toward the turbine wheel 12 (see FIG. 7A). Alternatively, the first elevation 210a and the second elevation 210b may extend axially toward the bearing housing 40 (see FIGS. 5A, 5B, 6A). In yet further refinements, the first elevation 210a may extend axially toward the turbine wheel 12 and the second elevation 210b may extend axially toward the bearing housing 40 (see FIGS. 3A, 3B and 4A). In other words, the second elevation 210b may extend toward the spring element 400. By virtue of the fact that the first elevation 210a extends toward the turbine wheel 12, an adequate axial spacing in an axial direction 22 to the turbine wheel 12 and/or to the bearing housing 40 (in particular to the projection 41) can be provided owing to the available installation space. If intended, it is thus furthermore possible for an adequate axial spacing of the multiple openings 300 and/or of the multiple cutouts 500 to the bearing housing 40 and/or to the turbine wheel 12 to be provided in order to be able to provide pressure relief or pressure equalization. Alternatively, it is also possible for the first elevation 210a to extend axially toward the bearing housing 40 and for the second elevation 210b to extend axially toward the turbine wheel 12 (not shown in the Figs.).

As shown for example in FIG. 4A, a first radial extent r1 of the first elevation 210a may be equal to or greater than a second radial extent r2 of the second elevation 210b as measured in the radial direction 24. The multiple openings 300 may be arranged in the first elevation 210a and/or in a first axial wall portion 220a that connects the first elevation 210a to the second ring portion 120 (see FIGS. 4B and 7A). Alternatively or in addition, the multiple openings 300 may however also be arranged in the second elevation 210b and/or in a second axial wall portion 220b (not shown in the Figs.). Here, the multiple openings 300 may be arranged radially at the inside or radially at the outside in the first axial wall portion 220a. The multiple openings 300 may also be arranged radially at the inside or radially at the outside in the second axial wall portion 220b. In refinements, the multiple openings 300 may also be arranged in the second ring portion 120 radially to the inside of the first elevation 210a, and/or in the second ring portion 120 between the first elevation 210a and the second elevation 210b, and/or in the second ring portion 120 radially to the outside of the second elevation 210b. Alternatively or in addition, the multiple openings 300 may also be arranged in the third ring portion 130. Here, each opening of the multiple openings 300 may have the above-described refinements at the respective positions.

As shown for example in FIGS. 4A and 7A, the first elevation 210a may extend as far as a first maximum elevation height h1, and the second elevation 210b may extend as far as a second maximum elevation height h2. In particular, the first maximum elevation height h1 may be equal to or greater than the second maximum elevation height h2. Here, the first and second maximum elevation heights h1, h2 may be measured correspondingly to the maximum elevation height h (see above). In particular, the respective maximum elevation height h1, h2 may be measured between a third plane E3, which runs on a side surface 101, 102, facing toward the respective elevation 210a, 210b, of the second ring portion 120, and a tangent T to the maximum height of the respective elevation 210a, 210b, which tangent runs parallel to said third plane. In other words, the first structure-stiffening feature 200a may thus be designed to be deeper than the second structure-stiffening feature 200b. This is determined on the basis of the available installation space between the turbine wheel 12 and the bearing housing. In the refinements of FIGS. 4A and 4B, the first maximum elevation height h1 may be between 0.4 mm and 1.2 mm, in particular between 0.5 mm and 1.1 mm. The second maximum elevation height h2 may be between 0.2 mm and 0.6 mm, in particular between 0.25 mm and 0.55 mm. Here, the respective elevation height h1, h2 is limited by the available installation space—in particular, the respective elevation height h1, h2 may be selected such that a spacing to the projection 41 and/or to a turbine wheel rear side 15 in an axial direction 22 of the heat shield 100 can be provided. In refinements, a ratio of the first maximum elevation height h1 to the material thickness t may be between 0.80 and 2.80, preferably between 1.00 and 2.50, particularly preferably between 1.70 and 2.30. In refinements, a ratio of the second maximum elevation height h2 to the material thickness t may be between 0.40 and 2.00, preferably between 0.60 and 1.80, particularly preferably between 1.10 and 1.40.

According to a further aspect of the present invention, a method for producing a heat shield 100 for a supercharging device 1 comprises the following steps:
 a) providing a sheet-metal material,
 b) forming a first ring portion 110, which is situated at the outside in a radial direction 24 and which is designed to bear the heat shield 100, and a second ring portion 120, which is situated at the inside in the radial direction 24 and which extends from the first ring portion 110, on the sheet-metal material,
 c) forming at least one structure-stiffening feature 200 in the second ring portion 120, the structure-stiffening feature 200 being of bead-like form.

The heat shield 100 produced by way of the method may have the refinements described above. Steps b) and c) may be performed in any sequence, or simultaneously. The heat shield 100 may be produced by way of a deformation process such as punching and/or stamping. In refinements, the heat shield may be produced by precision cutting. The at least one structure-stiffening feature 200 may be formed by way of a deformation process, wherein, in particular, the deformation process may involve stamping and/or punching. In refinements, the method may furthermore comprise the step of punching out the sheet-metal material such that the latter is of ring-shaped form. Here, the ring-shaped sheet-metal material may have the diameters d1 and d2 (see above). Even though the present invention has been described above and defined in the appended claims, it should be understood that the invention may alternatively also be defined according to the following embodiments:

1. A heat shield (100) for a supercharging device (1), comprising:
 a first ring portion (110), which is situated at the outside in a radial direction (24) and which is designed to bear the heat shield (100),
 a second ring portion (120), which is situated at the inside in the radial direction (24) and which extends from the first ring portion (110),
 wherein the second ring portion (120) has at least one structure-stiffening feature (200), the at least one structure-stiffening feature (200) being of bead-like form.
2. The heat shield (100) according to embodiment 1, wherein the at least one structure-stiffening feature (200) extends at least in certain portions in a circumferential direction (26).
3. The heat shield (100) according to embodiment 2, wherein the at least one structure-stiffening feature (200) extends in encircling fashion in a circumferential direction (26).
4. The heat shield (100) according to embodiment 3, wherein the at least one structure-stiffening feature (200) runs concentrically with respect to the heat shield (100).
5. The heat shield (100) according to any one of the preceding embodiments, wherein the at least one structure-stiffening feature (200) has an elevation (210) that is connected via an axial wall portion (220) to the second ring portion (120).
6. The heat shield (100) according to embodiment 5, wherein the at least one structure-stiffening feature (200) is arranged on the second ring portion (120) such that, when the heat shield (100) is arranged in an axial direction (22) between a turbine wheel (12), which is arranged in a turbine housing (11), and a bearing housing (40), which is coupled to the turbine housing (11), the elevation (210) extends axially toward the turbine wheel (12) or the elevation (210) extends axially toward the bearing housing (40).
7. The heat shield (100) according to embodiment 5 or embodiment 6, wherein the at least one structure-stiffening feature (200) is of arcuate form at least in certain portions in cross section, the elevation (210) and/or the axial wall portion (220) in particular being of arcuate form at least in certain portions.
8. The heat shield (100) according to embodiment 7, wherein the at least one structure-stiffening feature (200) is of arcuate form throughout in cross section, the elevation (210) and the axial wall portion (220) in particular being of arcuate form throughout.
9. The heat shield (100) according to any one of embodiments 5 to 7, wherein the at least one structure-stiffening feature (200) is of planar form at least in certain portions in cross section, the elevation (210) and/or the axial wall portion (220) in particular being of planar form at least in certain portions in cross section.
10. The heat shield (100) according to embodiment 9, wherein the elevation (210) is of planar form at least in certain portions in cross section, the planar portion of the elevation (210) being arranged in a plane that runs parallel or at an angle with respect to the second ring portion (120).
11. The heat shield (100) according to embodiment 9 or embodiment 10, wherein the axial wall portion (220) is of planar form at least in certain portions in cross section, and the planar portion of the axial wall portion (220) may be configured to be orthogonal or conical with respect to the second ring portion (120).
12. The heat shield (100) according to any one of embodiments 5 to 11, wherein, on a side of the elevation (210) that faces toward the second ring portion (120), in particular between the elevation (210) and axial wall portion (220), the at least one structure-stiffening feature (200) has an inner radius (240), the inner radius (240) being between 0.2 mm and 1.6 mm, the inner radius (240) in particular being between 0.3 mm and 1.2 mm.
13. The heat shield (100) according to embodiment 12, wherein a transition radius (250) on a side of the elevation (220) that faces toward the second ring portion (120), between the second ring portion (120) and the at least one structure-stiffening feature (200), in particular between the second ring portion (120) and the axial wall portion (220), is equal to or greater than the inner radius (240).
14. The heat shield (100) according to any one of the preceding embodiments, wherein the second ring portion (120) has multiple openings (300) that are spaced apart from one another in the circumferential direction (26).
15. The heat shield (100) according to embodiment 14 where dependent on embodiment 5, wherein the multiple openings (300) are arranged in the elevation (210) and/or in the axial wall portion (220) and/or in the second ring portion (120).
16. The heat shield (100) according to any one of the preceding embodiments, wherein the heat shield (100) has an inside edge (103) with an inner diameter (d1) and an outside edge (104) with an outer diameter (d2).
17. The heat shield (100) according to embodiment 16, wherein the heat shield (100) has, at the inside edge (103), multiple cutouts (500) that extend in a radial direction (24) from the inside edge (103), the multiple cutouts (500) in particular being spaced apart uniformly in a circumferential direction (24).
18. The heat shield (100) according to any one of the preceding embodiments, wherein the second ring portion (120) extends at an angle with respect to the first ring portion (110), the second ring portion (120) in particular being conical with respect to the first ring portion (110).
19. The heat shield (100) according to any one of the preceding embodiments, the heat shield (100) having a first side surface (101) and a second side surface (102) that is arranged opposite the first side surface (101).
20. The heat shield (100) according to embodiment 19, wherein the heat shield (100) has a first plane (E1), which runs through the first ring portion (110) at the first side surface (101) and which is arranged orthogonally with respect to the axial direction (22), and wherein the heat shield (100) has a second plane (E2), which is arranged so as to be spaced apart in an axial direction (22) from, and parallel to, the first plane (E1), the second ring portion (120) extending axially as far as the second plane (E2).
21. The heat shield (100) according to embodiment 20, wherein the first ring portion (110) is of planar form at least in certain portions, and the planar portion extends in the radial direction (22) in the first plane (E1).
22. The heat shield (100) according to any one of the preceding embodiments, wherein the first ring portion (110) and the second ring portion (120) are connected by a third ring portion (130), wherein, in particular, the third ring portion (130) is of conical and/or arcuate form with respect to the first ring portion (110).
23. The heat shield (100) according to any one of embodiments 16 to 22, wherein the second ring portion (120) extends as far as an intermediate diameter (d3) as measured in a radial direction (24), a ratio of the intermediate diameter (d3) to the outer diameter (d2) being at least 0.7.
24. The heat shield (100) according to any one of embodiments 5 to 23, wherein the elevation (210) extends as far as a maximum elevation height (h), the maximum elevation height (h) being measured between a third plane (E3), which runs on a side surface (101, 102), facing toward the elevation (210), of the second ring portion (120), and a tangent (T) to the maximum height of the elevation (210), which tangent runs parallel to said third plane.
25. The heat shield (100) according to any one of the preceding embodiments, wherein the heat shield (100) has a material thickness (t), the at least one structure-stiffening feature (200) in particular being formed on the second ring portion (120) such that the material thickness (t) thereof changes by at most 20% in relation to the material thickness (t) in adjacent regions of the second ring portion (120).
26. The heat shield (100) according to embodiment 24 and embodiment 25, wherein a ratio of the maximum elevation height (h) to the material thickness (t) is between 0.40 and 2.80, in particular between 0.60 and 2.50.
27. The heat shield (100) according to embodiment 24 and embodiment 25, wherein the maximum elevation height (h) is greater than the material thickness (t) of the second ring portion (120), the maximum elevation height (h) in particular being at least two times greater than the material thickness (t).
28. The heat shield (100) according to any one of the preceding embodiments, wherein the at least one structure-stiffening feature (200) extends in the radial direction (24) over more than 50% of a radial extent of the second ring portion (120).
29. The heat shield (100) according to any one of embodiments 5 to 28 where dependent on embodiment 1 or embodiment 2, wherein the at least one structure-stiffening feature (200) is of elongate form and extends in a radial direction (24).
30. The heat shield (100) according to any one of the preceding embodiments, wherein the second ring portion (120) has at least two structure-stiffening features (200a, 200b), the at least two structure-stiffening features (200a, 200b) in particular each being of bead-like form.
31. The heat shield (100) according to embodiment 30 and embodiment 29, wherein the at least two structure-stiffening features (200a, 200b, 200c, 200d) are spaced apart uniformly from one another in a circumferential direction (26).
32. The heat shield (100) according to embodiment 30 where dependent on any one of embodiments 1 to 28, wherein the at least two structure-stiffening features (200a, 200b) are spaced apart from one another in a radial direction (24), the second ring portion (120) in particular having a first structure-stiffening feature (200a), which is situated radially at the inside and which has a first elevation (210a), and at least one second structure-stiffening feature (200b), which is situated radially at the outside and which has a second elevation (210b).

33. The heat shield (100) according to embodiment 32 where dependent on embodiment 19, wherein the first elevation (210a) and the second elevation (210b) are arranged on the same side surface (101, 102) of the heat shield (100), the first elevation (210a) and the second elevation (210b) in particular being arranged on the first side surface (101) of the heat shield (100), or the first elevation (210a) and the second elevation (210b) being arranged on the second side surface (102) of the heat shield (100).

34. The heat shield (100) according to embodiment 32 where dependent on embodiment 19, wherein the first elevation (210a) and the second elevation (210b) are arranged on different side surfaces (101, 102) of the heat shield (100) wherein, in particular, the first elevation (210a) is arranged on the first side surface (101) and the second elevation (210b) is arranged on the second side surface (102).

35. The heat shield (100) according to any one of embodiments 32 to 34, wherein the first elevation (210a) and the second elevation (210b) are arranged on the second ring portion (120) such that, when the heat shield (100) is arranged in an axial direction (22) between a turbine wheel (12), which is arranged in a turbine housing (11), and a bearing housing (40), which is coupled to the turbine housing (11), the first elevation (210a) and the second elevation (210b) extend axially toward the turbine wheel (12), or the first elevation (210a) and the second elevation (210b) extend axially toward the bearing housing (40), or the first elevation (210a) extends axially toward the turbine wheel (12) and the second elevation (210b) extends axially toward the bearing housing (40).

36. The heat shield (100) according to any one of embodiments 32 to 35, wherein a first radial extent (r1) of the first elevation (210a) is equal to or greater than a second radial extent (r2) of the second elevation (210b) as measured in the radial direction (24).

37. The heat shield (100) according to any one of embodiments 32 to 36, wherein the multiple openings (300) are arranged in the first elevation (210a) and/or in a first axial wall portion (220a) that connects the first elevation (210a) to the second ring portion (120).

38. The heat shield (100) according to any one of embodiments 32 to 37, wherein the first elevation (210a) extends as far as a first maximum elevation height (h1), and the second elevation (210b) extends as far as a second maximum elevation height (h2), the respective maximum elevation height (h1, h2) being measured between a third plane (E3), which runs on a side surface (101, 102), facing toward the respective elevation (210a, 210b), of the second ring portion (120), and a tangent (T) to the maximum height of the respective elevation (210a, 210b), which tangent runs parallel to said third plane, the first maximum elevation height (h1) in particular being equal to or greater than the second maximum elevation height (h2).

39. The heat shield (100) according to embodiment 38, wherein the first maximum elevation height (h1) is between 0.4 mm and 1.2 mm, in particular between 0.5 mm and 1.1 mm, and wherein the second maximum elevation height (h2) is between 0.2 mm and 0.6 mm, in particular between 0.25 mm and 0.55 mm.

40. The heat shield (100) according to embodiment 38 or embodiment 39, wherein a ratio of the first maximum elevation height (h1) to the material thickness (t) is between 0.80 and 2.80, in particular between 1.00 and 2.50, and wherein a ratio of the second maximum elevation height (h2) to the material thickness (t) is between 0.40 and 2.00, in particular between 0.60 and 1.80.

41. The heat shield (100) according to any one of the preceding embodiments, wherein the heat shield (100) has a sheet-metal material.

42. A turbine arrangement (2) comprising:
a turbine (10) with a turbine housing (11) and with a turbine wheel (12) arranged in said turbine housing,
a shaft (30) that is coupled to the turbine wheel (12), and
a bearing housing (40) for rotatably bearing the shaft (30), the bearing housing (40) being coupled to the turbine housing (11),
characterized by a heat shield (100) according to any one of the preceding embodiments, the heat shield (100) being arranged in an axial direction (22) between the turbine wheel (12) and the bearing housing (40).

43. The turbine arrangement (2) according to embodiment 42, wherein the heat shield (100) has a first side surface (101) and an oppositely situated second side surface (102), the first side surface (101) facing toward the turbine wheel (12), and the second side surface (102) facing toward the bearing housing (40).

44. The turbine arrangement (2) according to embodiment 42 or embodiment 43, wherein the second ring portion (120) has at least two structure-stiffening features (200a, 200b), the second ring portion (120) in particular having a first structure-stiffening feature (200a), which is situated radially at the inside and which has a first elevation (210a), and at least one second structure-stiffening feature (200b), which is situated radially at the outside and which has a second elevation (210b), the first elevation (210a) and the second elevation (210b) extending axially toward the turbine wheel (12), or the first elevation (210a) and the second elevation (210b) extending axially toward the bearing housing (40), or the first elevation (210a) extending axially toward the turbine wheel (12) and the second elevation (210b) extending axially toward the bearing housing (40).

45. The turbine arrangement (2) according to any one of embodiments 42 to 44, furthermore comprising a variable turbine geometry (50) for varying an incoming flow to the turbine wheel (12), which variable turbine geometry is arranged radially outside the turbine wheel (12) and circumferentially surrounds the turbine wheel (12), wherein the heat shield (100) is arranged in an axial direction (22) between the variable turbine geometry (50) and the bearing housing (40).

46. The turbine arrangement (2) according to embodiment 45, wherein the variable turbine geometry (50) has a blade bearing ring (51) for bearing a multiplicity of adjustable blades, the heat shield (100) in particular being arranged between the blade bearing ring (51) and the bearing housing (40).

47. The turbine arrangement (2) according to any one of embodiments 42 to 46, wherein the first ring portion (110) makes areal contact, at least in certain portions, with the blade bearing ring (51).

48. The turbine arrangement (2) according to embodiment 46 or embodiment 47, furthermore comprising a spring element (400) that is designed to brace the variable turbine geometry (50) against the turbine housing (11), the heat shield (100) in particular being braced between the blade bearing ring (51) and the spring element (400).

49. The turbine arrangement (2) according to embodiment 48, wherein the first ring portion (110) is braced between the blade bearing ring (51) and the spring element (400), the first ring portion (110) in particular making areal contact, at least in certain portions, with the blade bearing ring (51) and/or with a bearing portion (410) of the spring element (400).

50. The turbine arrangement (2) according to embodiment 48 or embodiment 49, wherein the spring element (400) is a disk spring.

51. The turbine arrangement (2) according to any one of embodiments 48 to 50, wherein the spring element (400) is supported on the bearing housing (40), the spring element (400) in particular making linear contact with the bearing housing (40).

52. The turbine arrangement (2) according to any one of embodiments 46 to 51, wherein the blade bearing ring (51) has, radially at the inside on a side (52) that faces toward the bearing housing (40), a rabbet (53) for receiving the heat shield (100).

53. The turbine arrangement (2) according to any one of embodiments 42 to 46, wherein the first ring portion (110) is braced between the bearing housing (40) and the turbine housing (12).

54. The turbine arrangement (2) according to any one of embodiments 42 to 53, wherein the bearing housing (40) has a turbine-side projection (41) that extends in an axial direction (22) from the bearing housing (40) to the turbine wheel (12), and wherein the heat shield (100) is spaced apart in a radial direction (24) and/or in an axial direction (22) from the projection (41).

55. The turbine arrangement (2) according to embodiment 54 where dependent on embodiment 48, wherein the projection (41) has a first shoulder (41a), which is situated radially at the inside, and a second shoulder (41b), which is situated radially at the outside in relation to the first shoulder (41a), the spring element (400) being supported on a radial wall portion (42) of the second shoulder (41b).

56. A supercharging device (1) comprising:
   a turbine arrangement (2) according to any one of embodiments 42 to 55, and
   a compressor (60) with a compressor housing (61) and with a compressor wheel (62) arranged in said compressor housing, the compressor wheel (62) being coupled to the shaft (30) at an end of the shaft (30) that is situated opposite the turbine wheel (12), and the compressor housing (61) being coupled to the bearing housing (40).

57. The supercharging device (1) according to embodiment 56, furthermore comprising an electric motor that is arranged in a motor space in the bearing housing (40), the turbine wheel (12) and/or the compressor wheel (62) being coupled to the electric motor via the shaft (30).

58. A method for producing a heat shield (100) for a supercharging device (1), comprising:
   a) providing a sheet-metal material,
   b) forming a first ring portion (110), which is situated at the outside in a radial direction (24) and which is designed to bear the heat shield (100), and a second ring portion (120), which is situated at the inside in the radial direction (24) and which extends from the first ring portion (110), on the sheet-metal material,
   c) forming at least one structure-stiffening feature (200) in the second ring portion (120), the structure-stiffening feature (200) being of bead-like form.

59. The method according to embodiment 58, wherein the at least one structure-stiffening feature (200) is formed by way of a deformation process, the deformation process in particular involving stamping and/or punching.

60. The method according to embodiment 58 or embodiment 59, furthermore comprising punching out the sheet-metal material such that the latter is of ring-shaped form.

The invention claimed is:

1. A heat shield (100) for a supercharging device (1), comprising:
   a first ring portion (110), which is situated at the outside in a radial direction (24) and which is designed to bear the heat shield (100),
   a second ring portion (120), which is situated at the inside in the radial direction (24) and which extends from the first ring portion (110),
   wherein the second ring portion (120) has a first structure-stiffening feature (200a), which is situated radially at the inside and which has a first elevation (210a), and wherein the second ring portion (120) has at least one second structure-stiffening feature (200b), which is situated radially at the outside and which has a second elevation (210b), the first structure-stiffening feature (200a) and the at least one second structure-stiffening feature (200b) being of bead-like form,
   wherein the first elevation (210a) extends as far as a first maximum elevation height (h1), and the second elevation (210b) extends as far as a second maximum elevation height (h2), the respective maximum elevation height (h1, h2) being measured between a third plane (E3), which runs on a side surface (101, 102) facing toward the respective elevation (210a, 210b) of the second ring portion (120), and a tangent (T) to the maximum height of the respective elevation (210a, 210b) which tangent runs parallel to said third plane (E3),
   wherein the heat shield (100) has a material thickness, and wherein a ratio of the first maximum elevation height (h1) to the material thickness is between 0.80 and 2.80, and wherein a ratio of the second maximum elevation height (h2) to the material thickness is between 0.40 and 2.00.

2. The heat shield (100) as claimed in claim 1, wherein the first structure-stiffening feature (200a) and the at least one second structure-stiffening feature (200b) extend in encircling fashion in a circumferential direction (26), and wherein first elevation (210a) and the second elevation (210a) are connected via axial wall portions (220a, 220b) to the second ring portion (120).

3. The heat shield (100) as claimed in claim 2, wherein the first structure stiffening-feature (200a) and the at least one second structure-stiffening feature (200b) are of arcuate form at least in certain portions in cross section, the first and the second elevations (220a, 220b) and/or the axial wall portions (220a, 220b) being of arcuate form at least in certain portions.

4. The heat shield (100) as claimed in claim 3, wherein the first structure-stiffening feature (200a) and the at least one second structure-stiffening feature (200b) are of arcuate form throughout in cross section, the first and second elevations (210a, 210b) and the axial wall portions (220a, 220b) being of arcuate form throughout.

5. The heat shield (100) as claimed in claim 1, wherein the first structure-stiffening feature (200a) and the at least one second structure-stiffening feature (200b) are of planar form at least in certain portions in cross section, the first and second elevations (210a, 210b) and/or the axial wall portions (220a, 220b) being of planar form at least in certain portions in cross section.

6. The heat shield (100) as claimed in claim 2, wherein, on a side of the respective elevation (210a, 210b) that faces toward the second ring portion (120), between the respective elevation (210a, 210b) and axial wall portion (220a, 220b), the first structure-stiffening feature (200a) and the at least one second structure-stiffening feature (200b) has an inner radius (240), the inner radius (240) being between 0.2 mm and 1.6 mm.

7. The heat shield (100) as claimed in claim 2, wherein the second ring portion (120) has multiple openings (300) that are spaced apart from one another in the circumferential direction (26), the multiple openings (300) being arranged in the first elevation (210a) and/or second elevation (210b) and/or in the axial wall portions (220a, 220b) and/or in the second ring portion (120).

8. A heat shield (100) for a supercharging device (1), comprising:
a first ring portion (110), which is situated at the outside in a radial direction (24) and which is designed to bear the heat shield (100),
a second ring portion (120), which is situated at the inside in the radial direction (24) and which extends from the first ring portion (110),
wherein the second ring portion (120) has a first structure-stiffening feature (200a), which is situated radially at the inside and which has a first elevation (210a), and wherein the second ring portion (120) has at least one second structure-stiffening feature (200b), which is situated radially at the outside and which has a second elevation (210b), the first structure-stiffening feature (200a) and the at least one second structure-stiffening feature (200b) being of bead-like form, and
wherein the first elevation (210a) and the second elevation (210b) are arranged on the second ring portion (120) such that, when the heat shield (100) is arranged in an axial direction (22) between a turbine wheel (12), which is arranged in a turbine housing (11), and a bearing housing (40), which is coupled to the turbine housing (11), the first elevation (210a) extends axially toward the turbine wheel (12) and the second elevation (210b) extends axially toward the bearing housing (40).

9. The heat shield (100) as claimed in claim 1, wherein a first radial extent (r1) of the first elevation (210a) is equal to or greater than a second radial extent (r2) of the second elevation (210b) as measured in a radial direction (24).

10. The heat shield (100) as claimed in claim 1, wherein the second ring portion (120) has multiple openings (300) that are spaced apart from one another in the circumferential direction (26), and wherein the multiple openings (300) are arranged in the first elevation (210a) and/or in a first axial wall portion (220a) that connects the first elevation (210a) to the second ring portion (120).

11. The heat shield (100) as claimed in claim 1, wherein the first maximum elevation height (h1) is equal to or greater than the second maximum elevation height (h2).

12. The heat shield (100) as claimed in claim 1, wherein a ratio of the first maximum elevation height (h1) to the material thickness (t) is between 1.00 and 2.50, and wherein a ratio of the second maximum elevation height (h2) to the material thickness (t) is between 0.60 and 1.80.

13. A turbine arrangement (2) comprising:
a turbine (10) with a turbine housing (11) and with a turbine wheel (12) arranged in said turbine housing,
a shaft (30) that is coupled to the turbine wheel (12), and
a bearing housing (40) for rotatably bearing the shaft (30), the bearing housing (40) being coupled to the turbine housing (11),
characterized by a heat shield (100) as claimed in claim 1, the heat shield (100) being arranged in an axial direction (22) between the turbine wheel (12) and the bearing housing (40).

14. The turbine arrangement (2) as claimed in claim 13, furthermore comprising a variable turbine geometry (50) for varying an incoming flow to the turbine wheel (12), which variable turbine geometry is arranged radially outside the turbine wheel (12) and circumferentially surrounds the turbine wheel (12), wherein the heat shield (100) is arranged in an axial direction (22) between the variable turbine geometry (50) and the bearing housing (40).

15. The turbine arrangement (2) as claimed in claim 14, wherein the variable turbine geometry (50) has a blade bearing ring (51) for bearing multiple adjustable blades, and wherein the turbine arrangement (2) furthermore comprises a spring element (400) that is designed to brace the variable turbine geometry (50) against the turbine housing (11), the heat shield (100) being braced between the blade bearing ring (51) and the spring element (400).

16. A supercharging device (1) comprising:
a turbine arrangement (2) as claimed in claim 13, and
a compressor (60) with a compressor housing (61) and with a compressor wheel (62) arranged in said compressor housing, the compressor wheel (62) being coupled to the shaft (30) at an end of the shaft (30) that is situated opposite the turbine wheel (12), and the compressor housing (61) being coupled to the bearing housing (40).

17. A turbine arrangement (2) comprising:
a turbine (10) with a turbine housing (11) and with a turbine wheel (12) arranged in said turbine housing,
a shaft (30) that is coupled to the turbine wheel (12), and
a bearing housing (40) for rotatably bearing the shaft (30), the bearing housing (40) being coupled to the turbine housing (11),
characterized by a heat shield (100) as claimed in claim 9, the heat shield (100) being arranged in an axial direction (22) between the turbine wheel (12) and the bearing housing (40).

* * * * *